US010990865B2

(12) United States Patent
Evans et al.

(10) Patent No.: US 10,990,865 B2
(45) Date of Patent: Apr. 27, 2021

(54) METHODS AND ARRANGEMENTS FOR RECONCILING DATA FROM DISPARATE DATA CARRIERS

(71) Applicant: Digimarc Corporation, Beaverton, OR (US)

(72) Inventors: Eric D. Evans, Portland, OR (US); Christopher M. Haverkate, Newberg, OR (US); Mark-Andrew Ray Tait, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 16/444,959

(22) Filed: Jun. 18, 2019

(65) Prior Publication Data

US 2019/0385034 A1    Dec. 19, 2019

Related U.S. Application Data

(60) Provisional application No. 62/686,617, filed on Jun. 18, 2018.

(51) Int. Cl.
*G06K 19/06* (2006.01)
*G06K 7/14* (2006.01)

(52) U.S. Cl.
CPC ..... *G06K 19/06065* (2013.01); *G06K 7/1417* (2013.01); *G06K 7/1486* (2013.01); *G06K 19/06037* (2013.01); *G06K 19/06075* (2013.01)

(58) Field of Classification Search
CPC ..... G03H 1/0011; G06K 19/06; G06K 7/1094
USPC .............. 235/457, 454, 462.34, 375
See application file for complete search history.

(56) References Cited

U.S. PATENT DOCUMENTS

| 5,365,048 | A | 11/1994 | Komiya |
| 9,690,967 | B1 | 6/2017 | Brundage |
| 1,019,878 | A1 | 2/2019 | Bradley |
| 1,026,217 | A1 | 4/2019 | Powell |
| 2002/0179715 | A1 | 12/2002 | Kawai |
| 2004/0158724 | A1* | 8/2004 | Carr ...................... B42D 25/333 |
| | | | 713/186 |

(Continued)

FOREIGN PATENT DOCUMENTS

| EP | 0736854 A1 | 10/1996 |
| WO | 2019246132 | 12/2019 |

OTHER PUBLICATIONS

International Search Report and Written Opinion for Application No. PCT/US2019/037778, dated Oct. 7, 2019, 13 pages.

*Primary Examiner* — Edwyn Labaze
(74) *Attorney, Agent, or Firm* — Digimarc Corporation

(57) ABSTRACT

In an illustrative system, a point-of-sale scanner is equipped to respond to multiple different symbologies printed on a single product. The scanner captures many frames per second, as products are swiped through a viewing volume. Each frame is decoded, yielding one or more payloads. A reconciliation module compares each newly-decoded payload against a list of payloads previously output by the module, to determine if the current payload is semantically-equivalent to a previously-output payload. If so, the previously-output payload is output again, in lieu of the just-decoded payload. If no equivalent is found, the current payload is output and added to the list for comparison against future payloads. A great number of other features and arrangements are also detailed.

17 Claims, 12 Drawing Sheets

(56) References Cited

U.S. PATENT DOCUMENTS

| | | | |
|---|---|---|---|
| 2007/0273774 A1* | 11/2007 | Holmes | H04N 9/8205 |
| | | | 348/231.2 |
| 2008/0029604 A1 | 2/2008 | Blanford | |
| 2012/0048933 A1 | 3/2012 | Hasegawa | |
| 2015/0090503 A1 | 4/2015 | McQueen | |
| 2015/0278753 A1* | 10/2015 | Hookom | G16H 20/40 |
| | | | 235/385 |
| 2017/0046605 A1* | 2/2017 | Asthana | G06K 19/06037 |

* cited by examiner

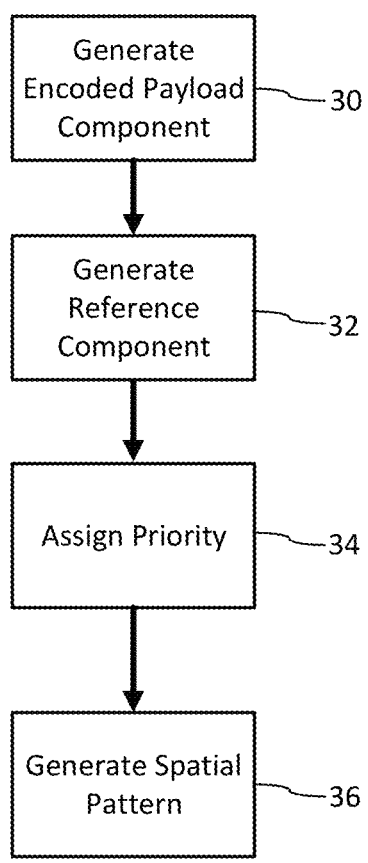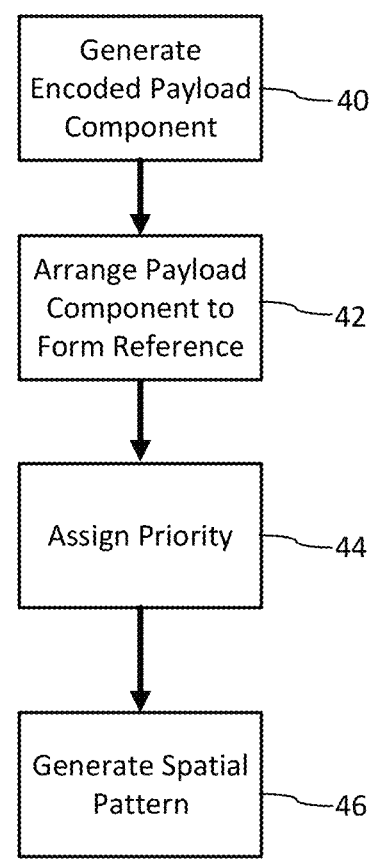
FIG. 17                    FIG. 18

METHODS AND ARRANGEMENTS FOR RECONCILING DATA FROM DISPARATE DATA CARRIERS

RELATED APPLICATION DATA

This application claims priority from provisional application 62/686,617, filed Jun. 18, 2018, the disclosure of which is incorporated herein by reference.

BACKGROUND AND SUMMARY

Retail products are commonly marked with UPC-A barcodes, which are black and white indicia that encode standardized product identifiers (Global Trade Identification Numbers, or GTINs). A barcode scanner at a point of sale (POS) terminal can read this identifier from a product, look-up the item name and price in a database, and add the product to a shopper's checkout tally.

Historically, each product has been marked with one barcode. That is changing. Applicant has introduced a different form of barcode (the "Digimarc Barcode" indicia) that avoids drawbacks of conventional barcodes. Instead of being a conspicuous arrangement of black and white lines, or checkerboard arrangement, applicant's indicia encodes data into more globally-dispersed patterns, such as subtle localized changes to luminance or chrominance of a package's artwork, or a sprinkling of small dots across the background of a deli- or bakery-item label. Such dispersed representation of the data makes scanning easier, because the product doesn't have to be manipulated so that a certain small region of the package is in view of the scanner. Some products are now marked with both a conventional barcode, and with a Digimarc Barcode indicia.

FIG. 1 shows an example—a label that includes both a conventional barcode (a "DataBar" code), and a Digimarc Barcode indicia (the sprinkling of dots in the background).

While advantageous, the introduction of this technology has introduced a new complication: what happens when a product includes both a conventional barcode and a Digimarc Barcode indicia, and they convey different data? The present technology concerns methods and arrangements to address this situation.

This is important because a point of sale scanner should never cause a shopper to be overcharged. If a product conveys both a conventional barcode and a Digimarc barcode, and they convey different data, then a shopper could be charged for two items instead of one.

Prior art POS scanners have employed "double-read" protection systems to avoid double-charging shoppers when a product's barcode is depicted in two close-in-time scanner images. But this doesn't address the situation in which two different indicia are read, and they convey different data.

(A prior art double-read protection system starts a timer each time a data string is decoded from a barcode. If the exact string is decoded a second time, before the timer has expired, that string is not again reported for inclusion on the shopper's tally, but instead is ignored. Additional details of exemplary double-read protection systems are provided in patent publications U.S. Pat. No. 5,365,048, 20020179715, 20080029604, 20120048933, and 20150090503, the disclosures of which are incorporated by reference.)

Some packages have previously had multiple barcodes, conveying different data. An example is a box from an online merchant that is shipped by UPS. The merchant and UPS each have their own barcode on the box—each for a different purpose. (The merchant barcode may be a UPC-A barcode that conveys a link to a database record indicating the customer, the order number, and the box contents. The UPS barcode may be a QR code that encodes the airport(s) through which the shipment is to be routed, and the customer's destination address.) Multiple barcodes with different data is not a problem in such cases because the merchant and UPS employ reader devices that are customized to their respective needs. The barcode reader employed by UPS does not read the barcode employed by the merchant, and vice versa.

In contrast, supermarket scanners can read both conventional barcodes and Digimarc Barcode indicia.

In accordance with one aspect of the present technology, a scanner is equipped to respond to multiple different symbologies printed on a single product. The scanner captures many frames per second, as the product is swiped through a viewing volume. Each frame is decoded, yielding one or more payloads. A reconciliation module compares each newly-decoded payload against a list of payloads previously output by the module, to determine if the current payload is semantically-equivalent to a previously-output payload. If so, the previously-output payload is output again, in lieu of the just-decoded payload. If no equivalent is found, the current payload is output and added to the list for comparison against future payloads.

The foregoing and additional features and arrangements will be more readily apparent from the following detailed description, which proceeds with reference to the accompanying diagrams.

BRIEF DESCRIPTION OF THE DRAWINGS

FIGS. 17-20 detail algorithms associated with an illustrative encoding technique.

DETAILED DESCRIPTION

Essentially all retail packages are marked with a barcode symbology that encodes a "GTIN"—a Global Trade Identification Number that identifies the item. The GTIN for a 12 oz. box of Kellogg's Corn Flakes cereal is 038000001109. This 12-digit code comprises a prefix identifying Kellogg's as the owner, i.e., 038000, and 5 more digits that serve as an item reference number for Corn Flakes cereal among Kellogg's offerings, i.e., 00110. The final digit is a check digit, computed from the earlier 11 digits. (Company prefixes can be longer or shorter than six digits, in which case the item reference numbers are shorter or longer.)

GTINs, and other aspects of most barcodes, are standardized by specifications published by GS1, a non-profit industry group.

Figure 2:
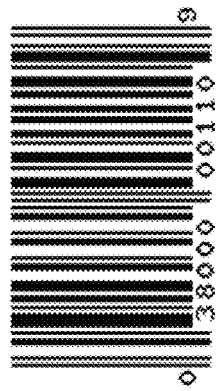
Figure 3:
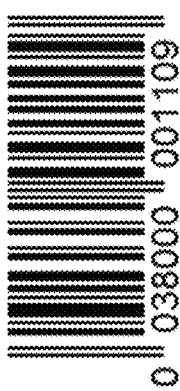
Figure 4:
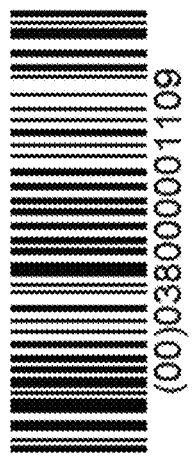

A GTIN can be conveyed by many different symbologies (sometimes termed "indicia" or "data carriers"). Most common is the UPC-A symbology, as shown in FIG. 2. Other symbologies, e.g., EAN-13 shown in FIG. 3 and GS1-128 shown in FIG. 4, carry 13- and 14-digit counterparts to this code. The Digimarc Barcode indicia also carries a 14-digit counterpart, and can carry other information as well. All these payloads convey the same GTIN; they are semantically equivalent. The shorter ones are left-padded with zeroes to extend their lengths to 14 digits.

| | |
|---|---|
| UPC-A | 038000001109 |
| EAN-13 | 0038000001109 |
| GS1-128 | 00038000001109 |
| Digimarc Barcode | 00038000001109 |

The Digimarc Barcode indicia is different from conventional barcodes in various respects. One is that it is less visually obtrusive. Another is that it commonly takes the form of a square block of data (e.g., encoding a 98 bit binary payload), and this block of data is redundantly tiled across and down the printed medium, as illustrated by the dashed squares in FIG. 1A. (Only a few of the blocks are shown, but the pattern extends across the label, except for areas immediately around other text and graphics, where a keep-out area is usually maintained.) Such redundant tiling is sometimes termed "holographic" encoding. As used herein, "holographic" means that redundant representations of the payload data are printed in a tiled array, with a periodic spacing of K inches vertically and horizontally, and that the encoding spans an area large enough that two points on the encoded label, that are a distance of 2.5K apart, are both amidst the encoding pattern, e.g., points X and Y in FIG. 1A. (Often points separated by a larger distance, e.g., 3 or 4K, are still amidst the encoding pattern, as in points A and B in FIG. 1A.) The blocks are usually square, but can be other shapes, e.g., rectangles or hexagons.

Barcodes, both conventional and the Digimarc Barcode indicia, can carry information in addition to the GTIN, such as weight, price and sell-by date. The DataBar barcode is presently popular for this purpose. Each element of a DataBar payload is prefixed by a code (an "Application Identifier," or AI) that indicates what the following "element value" data represents. An AI of "01" precedes a 14-digit GTIN element value. An AI of "16" precedes a sell-by date element value, in YYMMDD format. An AI of "30" precedes an item count element value. An AI of "3922" precedes a price—with 2 digits after the decimal point. An AI of "3103" precedes a weight in kilograms, with 3 digits after the decimal point. Again, GS1 standards specify these AIs and their details.

Figure 5:
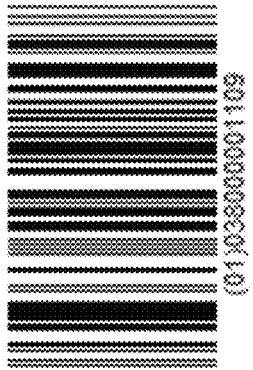
FIGS. 2-7 illustrate various different forms of barcodes, each conveying the GTIN for a box of Kellogg's Corn Flakes cereal.
Figure 6:
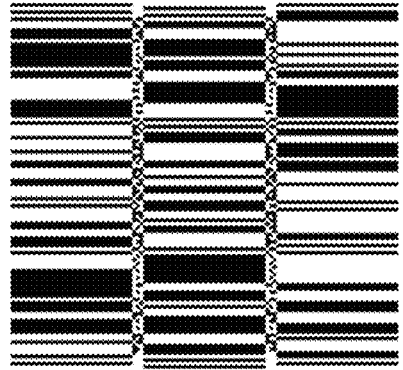
Figure 7:
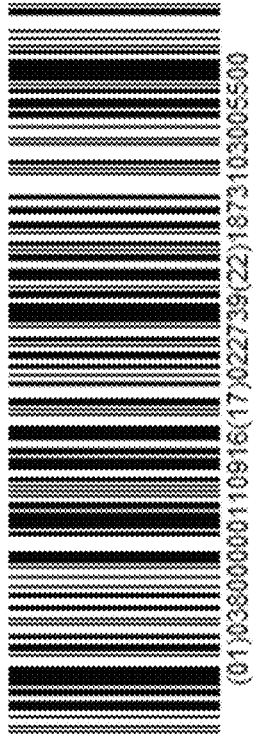

FIG. 5 shows the Kellogg's Corn Flakes GTIN, alone, encoded in DataBar format. FIGS. 6 and 7 show the same GTIN in DataBar format, augmented with fictional sell-by, price, and weight data. FIG. 6 shows a linear arrangement; FIG. 7 shows a "stacked" arrangement.

The payload string encoded in the latter two symbologies is:

(01)038000001109(16)170227(3922)187(3103)005500

To aid in visual understanding, the four Application Identifiers in this string are indicated by parentheses. No parentheses are actually encoded.

All six of the symbologies in FIGS. 2-7 encode the same GTIN for Kellogg's Corn Flake cereal. Yet all except the last two convey different payloads.

Some Application Identifiers are always followed by element values of fixed-length. For example, GS1 standards specify that the "01" AI is always followed by a 14-digit GTIN. The weight and expiration date AIs are always followed by six-digit strings. Other AIs, however, are followed by variable length data. Price (3922) is an example. The 3922 AI can be followed by between 1 and 15 digits. A 99 cent item may thus be coded as 392299 or 3922099 or 39220099, etc. Item count (AI 30) is another. The "30" AI can be followed by between 1 and 8 digits. Such variable length data fields make it uncertain where the next Application Identifier begins. In such instances, a "group separator" (also known as a "FNC1") code is commonly inserted, represented as ASCII symbol 29. In text such as this, the group separator code is commonly written as "<GS>".

It will be recognized that the above DataBar payload could benefit by a <GS>. The 3922 price Application Identifier is followed by digits 187(3103)00 . . . . The parentheses indicate that the 3103 is the next Application Identifier (for weight). But absent demarcation, some or all of the following digits might be mistaken for more of the price, e.g., a price of $18.73, or of $187.31, or of $1873.10, etc.

The Application Identifier 3103 precedes the weight in kilograms. The final "3" indicates the following data will include three digits after the decimal point. That is, the six digits represent the weight in the format xxx.xxx kg.

If weight down to the thousandth of a kilogram is not required, then a different Application Identifier, 3102, can be used. This one precedes a data string having two digits after the decimal point. That is, the six digits represent the weight in the format xxxx.xx kg.

Still further, there are corresponding Application Identifiers for weight in pounds. AI 3203 is the pound weight with three digits after the decimal point, AI 3202 is the pound weight with two digits after the decimal point. Thus, in labeling a 1.5-pound deli container of cole slaw (i.e., 0.68 kg), the weight can be expressed with any of four different strings:

3203001500
3202000150
3103000680
3102000068

In a perfect world, the payload of a DataBar code would include the Application Identifiers in numeric order, starting with "01" and the GTIN. However, this convention is not followed reliably. Likewise, variable length element values (e.g., price and item count) are desirably put at the end of the string in order to avoid ambiguity about where they end, and avoid an unnecessary <GS> digit. But exceptions invariably occur.

Composition of DataBar data strings can have other idiosyncrasies—in addition to those just-noted. But from the above issues, alone, one can recognize that semantically-equivalent data strings can take a great variety of different forms. For example, each of the following 24 strings indicates the same GTIN (01) of 038000001109, the same sell-by date of Feb. 27, 2017 (16), the same price of $1.87 (3922), and the same weight of 5.5 kg or 10.126 pounds (3103, 3102, 3203, 3202) (with parentheses once again added to aid in understanding):

(01)038000001109(16)170227(3922)187(3103)005500
(01)038000001109(16)170227(3103)005500(3922)187
(01)038000001109(3922)187(16)170227(3103)005500
(01)038000001109(3922)187(3103)005500(16)170227
(01)038000001109(3103)005500(16)170227(3922)187
(01)038000001109(3103)005500(3922)187(16)170227

(01)038000001109(16)170227(3922)187(3102)00550
(01)038000001109(16)170227(3102)00550(3922)187
(01)038000001109(3922)187(16)170227(3102)00550
(01)038000001109(3922)187(3102)00550(16)170227
(01)038000001109(3102)00550(16)170227(3922)187
(01)038000001109(3102)00550(3922)187(16)170227
(01)038000001109(16)170227(3922)187(3202)01013
(01)038000001109(16)170227(3202)01013(3922)187
(01)038000001109(3922)187(16)170227(3202)01013
(01)038000001109(3922)187(3202)01013(16)170227
(01)038000001109(3202)01013(16)170227(3922)187
(01)038000001109(3202)01013(3922)187(16)170227
(01)038000001109(16)170227(3922)187(3203)010126
(01)038000001109(16)170227(3203)010126(3922)187
(01)038000001109(3922)187(16)170227(3203)010126
(01)038000001109(3922)187(3203)010126(16)170227
(01)038000001109(3203)010126(16)170227(3922)187
(01)038000001109(3203)010126(3922)187(16)170227

The first 6 of these strings include the same data, in different order. The next 6 are equivalent, but express the weight in kg using the 2-digits-after-the-decimal AI 3102. The next 6 are equivalent, but express the weight in pounds using the 2-digits-after-the-decimal AI 3202.

The final 6 are equivalent, but express the weight in pounds using the 3-digits-after-the-decimal AI 3203.

None of these strings reflects any variation in field length, such as adding one or two or three leading zeroes to the price of $1.87. When such variations are taken into account, the number of semantic equivalents balloons further.

Although the GS1 specifications are comprehensive (455 pages, in the case of the primary document, "GS1 General Specifications, Release 18, January 2018")), they fail to consider the possibility that an item may be marked with the same information, carried by two symbologies. In some cases, such as when a single image of an item is captured, a prioritization between symbologies might be specified by a standard. For example, the standards could state to use the payload from a DataBar code, and if absent then to use the payload from an EAN-13 code, and if absent then to use the payload from a UPC-A code, etc. But the standards don't address such possibility.

Moreover, the standard doesn't even set a requirement for the order of different data fields conveyed by a barcode.

The situation becomes more complex when a multitude of frames is captured, as an item is passing through a viewing volume of a scanner. How then to proceed, when a DataBar might be decoded from one frame, a different symbology might be decoded from a second frame, both symbologies might be decoded from a third frame—and each of the symbologies conveys data in an unknown order? Again, the GS1 standards (including the 17 previous versions of the General Specification) fail to specify.

Applicant's technology provides a solution to this problem.

Figure 8:
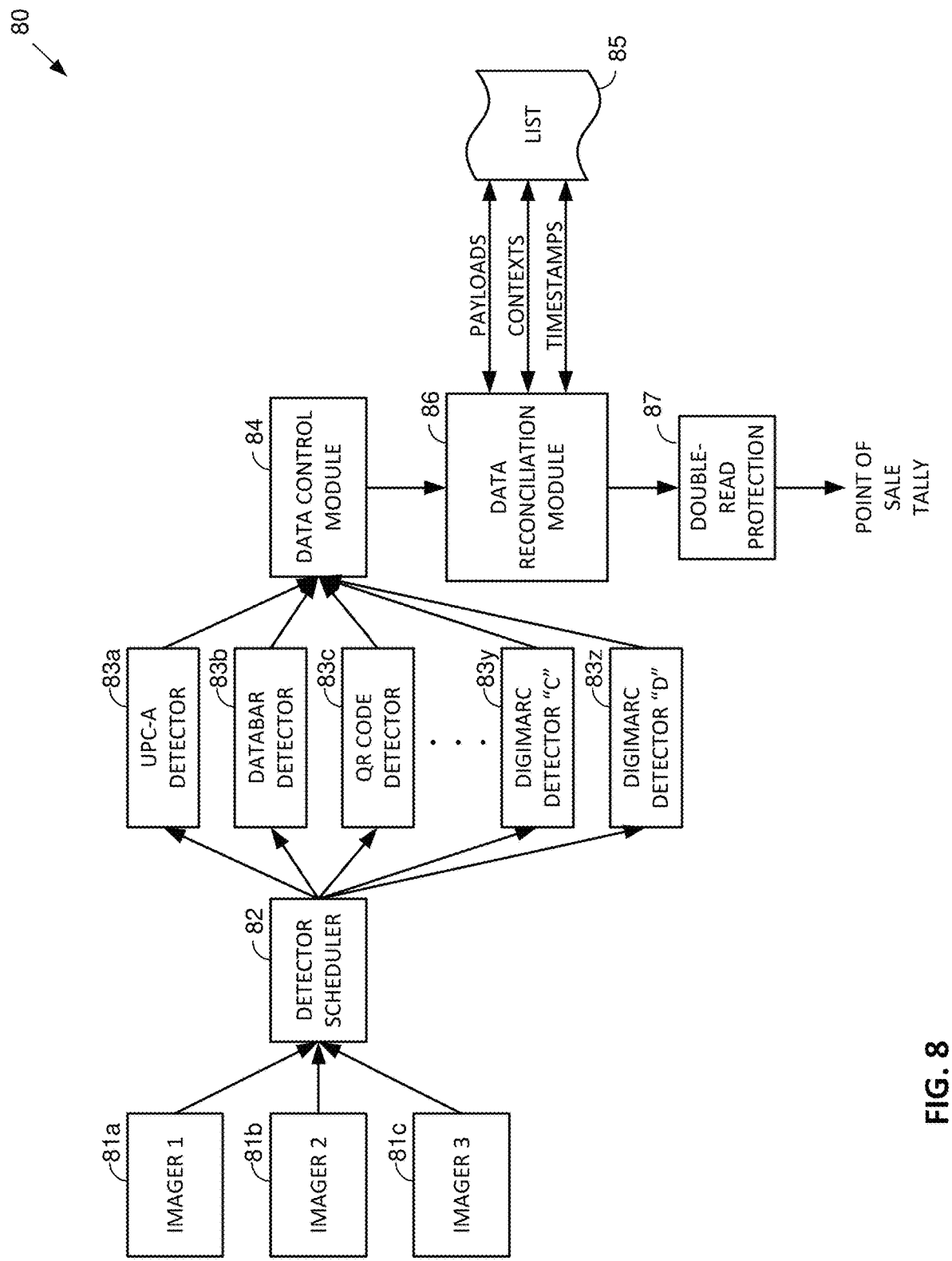
FIG. 8 illustrates an exemplary embodiment including aspects of the present technology.

FIG. 8 shows the data flow of one particular embodiment. A scanner 80 includes one or more imagers, or cameras 81a, 81b, 81c. Each provides a series of captured image frames to a detector scheduler module 82, which passes along certain image frames to various symbology detectors 83. The scheduler module may send all of the incoming image frames to all of the available symbology detectors. More frequently, however, the scheduler module 82 prioritizes certain cameras or certain detectors, e.g., sending only every-other frame from the cameras to a Digimarc detector.

The various different detectors each decodes its respective symbology, and outputs a payload string. The payload data from the different detectors are compiled by a data control module 84, which generates a consolidated feed of decoded data for sequential processing by a reconciliation module 86.

The reconciliation module 6 processes the feed of data from the control module 84, in conjunction with data it maintains in a cached list 85. This cache stores a running list of payload strings output from the reconciliation module 86, each associated with a timestamp and context data—such as the type of data carrier (symbology) from which it was decoded (i.e., the detector 83a-83z from which it was received).

The reconciliation module 86 determines if the current payload, in the feed of data from control module 84, is equivalent to any of the cached payloads output in a previous, typically-fixed, interval (e.g., 150 milliseconds. If so, the reconciliation module does not output the current payload. Instead, it outputs the previous, equivalent payload. This enables the following double-read protection module 87 to do its work—recognizing close-in-time repeated payloads, and suppressing all but the first, so as to avoid double- (or triple-) charging the consumer. The reconciliation module 86 writes, to the cache, whatever payloads it outputs, together with timestamp and data carrier data. When a payload is output from the reconciliation module, and clears the following double-read protection module, a beep is sounded to confirm the action.

Figure 9:
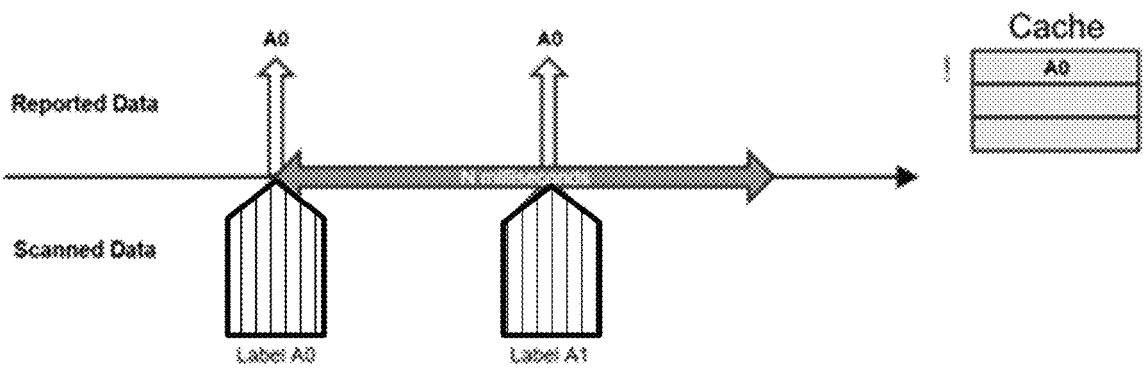
FIGS. 9-11 are diagrams showing illustrative operation sequences for the embodiment of FIG. 8.

FIG. 9 illustrates one sequence of operations. A scanner decodes a fresh food label that yields a payload represented by "A0." The data reconciliation module 86 outputs the A0 payload, and writes this value into the cached list 85. A short time later, the scanner decodes a second label, this one yielding a payload represented by "A1." The data reconciliation module determines that payloads A0 and A1 are semantically equivalent, and that the A1 payload was detected within a 150 ms time window of the A0 payload. In such case, the reconciliation module outputs the information from the second label, but does so using its equivalent, earlier-sent representation, i.e., A0. The original A0 entry in the cache is maintained, but its timestamp is updated to indicate the time the second A0 payload was output.

(If a payload A0 is received, and 100 ms later—and for a further minute—the payload A1 is repeatedly received—at continuing intervals of 100 ms, the scanner will output the A0 payload about 600 times, each time updating the single A0 cache entry with the current timestamp value. This despite the fact that 99+% of the decoded payloads conveyed A1 rather than A0.)

Figure 10:
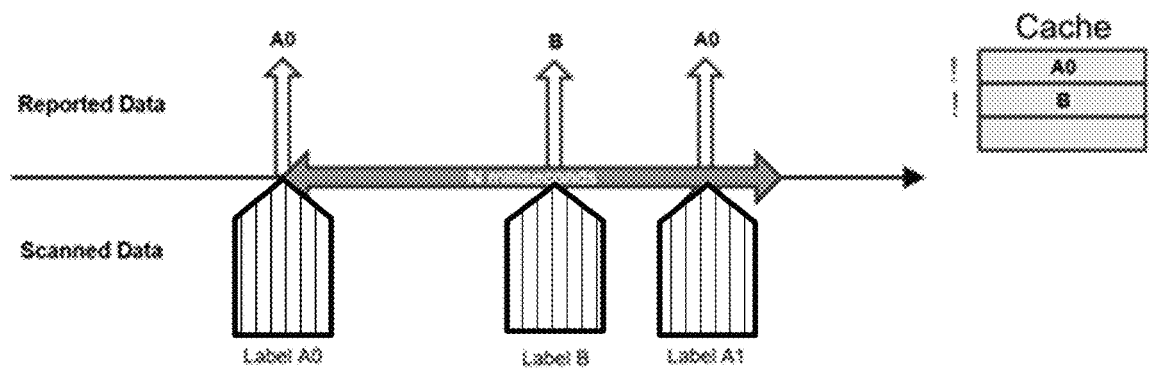
Figure 11:
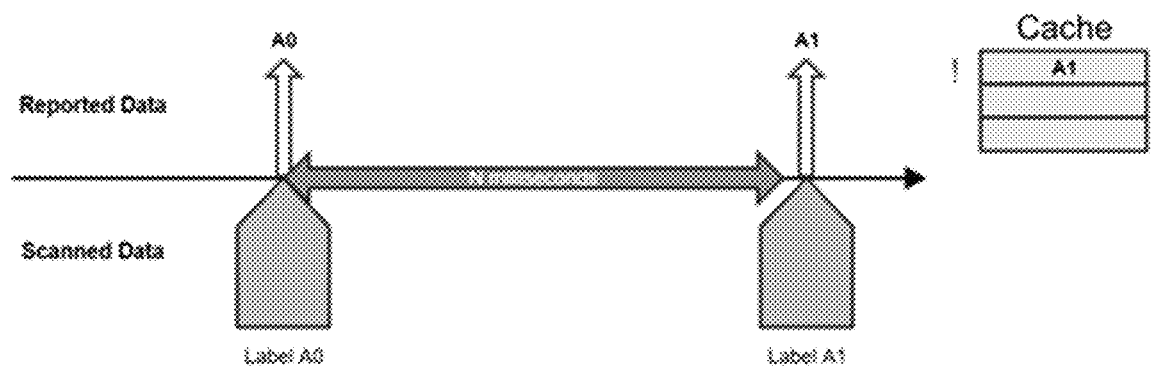

FIG. 10 shows a case similar to FIG. 9, except that between the A0 and A1 labels, a label bearing a "B" payload is decoded. The reconciliation module 86 finds no semantic equivalence in the cache when the B payload is received. This B payload is output for reporting to the POS terminal, and a corresponding entry is made in the cache. When the scanner next decodes label A1 (still within 150 ms of A0), the reconciliation module recognizes that A1 is a semantic equivalent of A0, outputs the earlier A0 payload, and updates the A0 timestamp to the current time.

Figure 12:
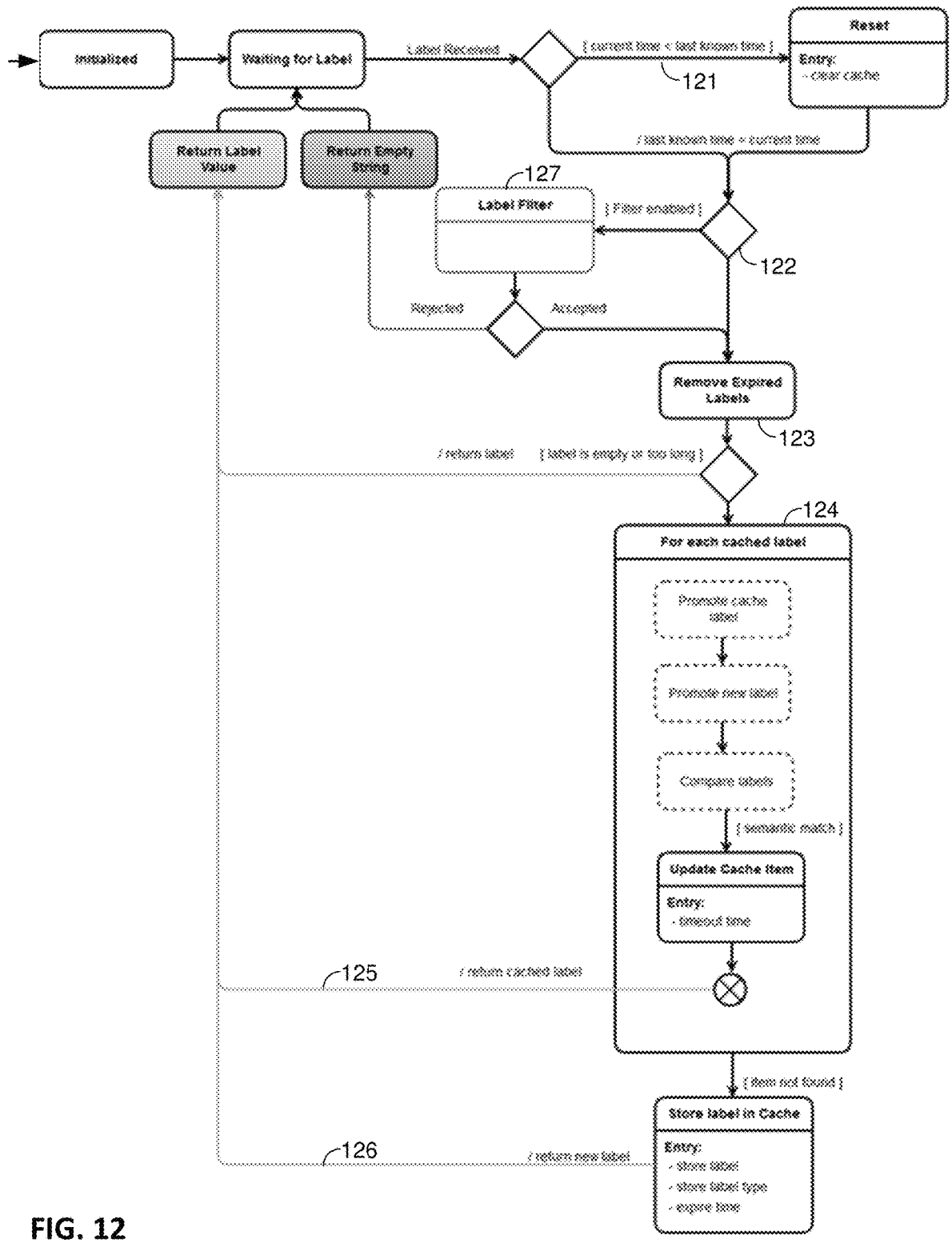
FIGS. 12-16 detail algorithms employed in the embodiment of FIG. 8.

FIG. 12 shows a different situation, in which the scanner decodes labels bearing semantically-equivalent A0 and A1 payloads, but outside of a common time window. In this case, semantic equivalence (or not) does not matter because they are not in a common time window. When the reconciliation module outputs the first, A0, payload, the cache is written accordingly. More than 150 ms later, the second, A1 payload is received from the control module 84. In checking the cache, the reconciliation module 86 first removes any entries that should age-off (i.e., that are more than 150 milliseconds old). Accordingly, it removes the A0 entry from the cache. Nothing is left cached, so there is no issue of any semantic equivalence to consider. The reconciliation module outputs the A1 payload, and writes this payload—and its symbology and timestamp—to the cached list 85.

A particular logic arrangement configured to implement the just-described arrangements, is detailed by the state diagrams of FIGS. 12-16.

The process starts in the upper left of FIG. 12, with the reconciliation module 86 waiting for a decoded payload. When one is received, two preliminary checks are made before reconciliation begins.

First, module 86 checks (121) to see if the system clock (a counter) has rolled over and now indicates a lower value than the last known time. (In one particular counter implementation, this happens about once every 50 days.) If so, the 150 milliseconds of data in the cache is flushed. The last known time is set to the current time, and a following branch 122 depends on whether a label filter module 127 is present and activated.

The label filter module 127 deals with a rare situation: a single item being marked with both a conventional barcode and a Digimarc Barcode indicia, with the two markings indicating different GTINs. One situation in which this can occur is when artwork for a package is printed with a press plate left-over from a prior, different press run. For example, label artwork for sodium-free chicken stock may be run on a press immediately following label artwork for regular chicken stock. Many of the artwork elements between the labels may be visually identical, and in haste, a plate from the former run might be used erroneously in the latter run—and introduce a conflicting GTIN.

Label filter technology is detailed in application Ser. No. 15/441,006, filed Feb. 23, 2017 (now U.S. Pat. No. 10,262, 176), and Ser. No. 15/704,833, filed Sep. 14, 2017 (now U.S. Pat. No. 10,198,782), the disclosures of which are incorporated by reference.

If label filtering is active, and a conflict is detected with another payload, then a filtering action is invoked—including ignoring the current label payload. Normally, however, label filtering finds no issue, and the process continues to block 123, in which the cache 85 is cleared of out-of-date items (i.e., those time-stamped more than 150 milliseconds ago).

The payload of the current label is next semantically-compared with the payload of each other label in the cache, at block 124. This process starts by "promoting" the payloads of the current label, and of each cached payload with which it is being compared. Promoting here refers to zero-padding the GTIN strings to expand them to a maximum length specified by GS1, i.e., 14 digits. If the payload includes a GTIN without a leading Application Identifier of "01," then such AI is prepended to the string.

If a cached payload is a UPC-A label, with a 12-digit GTIN, then "promoting" that label involves zero-padding to bring the GTIN value to 14 digits, and adding "01" to the beginning. The payloads are then compared—as detailed more fully in later diagrams.

If the current payload is found to semantically match a payload in the cache, the timestamp of the previous payload is updated to the current time. The previous payload data is then output (125).

If the current payload doesn't semantically match any of the payload data stored in the cache, the reconciliation module writes a new entry to the cache, specifying the current label payload, its context (e.g., symbology), and a timestamp. The current payload data is then output (126).

Figure 13:
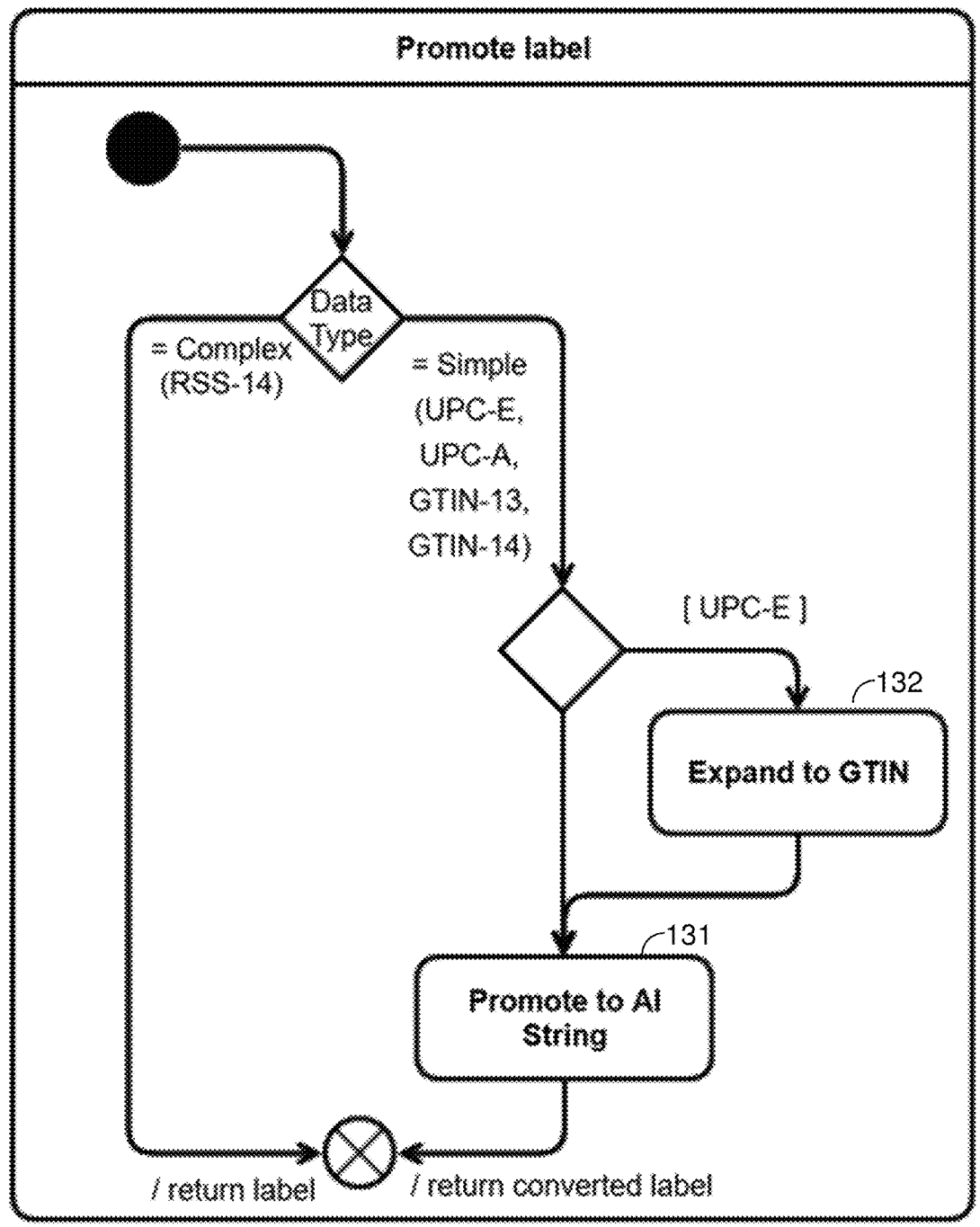

FIG. 13 details the "promotion" process just-discussed. If the data carrier is a DataBar symbology (also known as RSS-14), no action is taken. The input payload is output without change. If the data carrier is a UPC-E, UPC-A, GTIN-13 (EAN-13), GTIN-14, or other code, then it is zero-padded at the left to bring its GTIN element to 14 digits, and is prepended with a "01", by process 131.

UPC-E is an odd case. This is a reduced-size symbology, e.g., used on packs of gum, cigarettes, and other small items. While UPC-A conveys an 11-digit GTIN, plus a check digit, UPC-E conveys a 6-digit GTIN, plus a check digit. The 6-digit value is obtained by a compression scheme that exploits zeroes in the GTIN. The Kellogg's Corn Flakes GTIN, which in UPC-A form is 03800000110x (where 'x' is the check digit), is 381100x in UPC-E form. If a label is expressed by a UPC-E code, then it is expanded to a 14-digit expression by process 132. The promoted payload value is then output.

Figure 14:
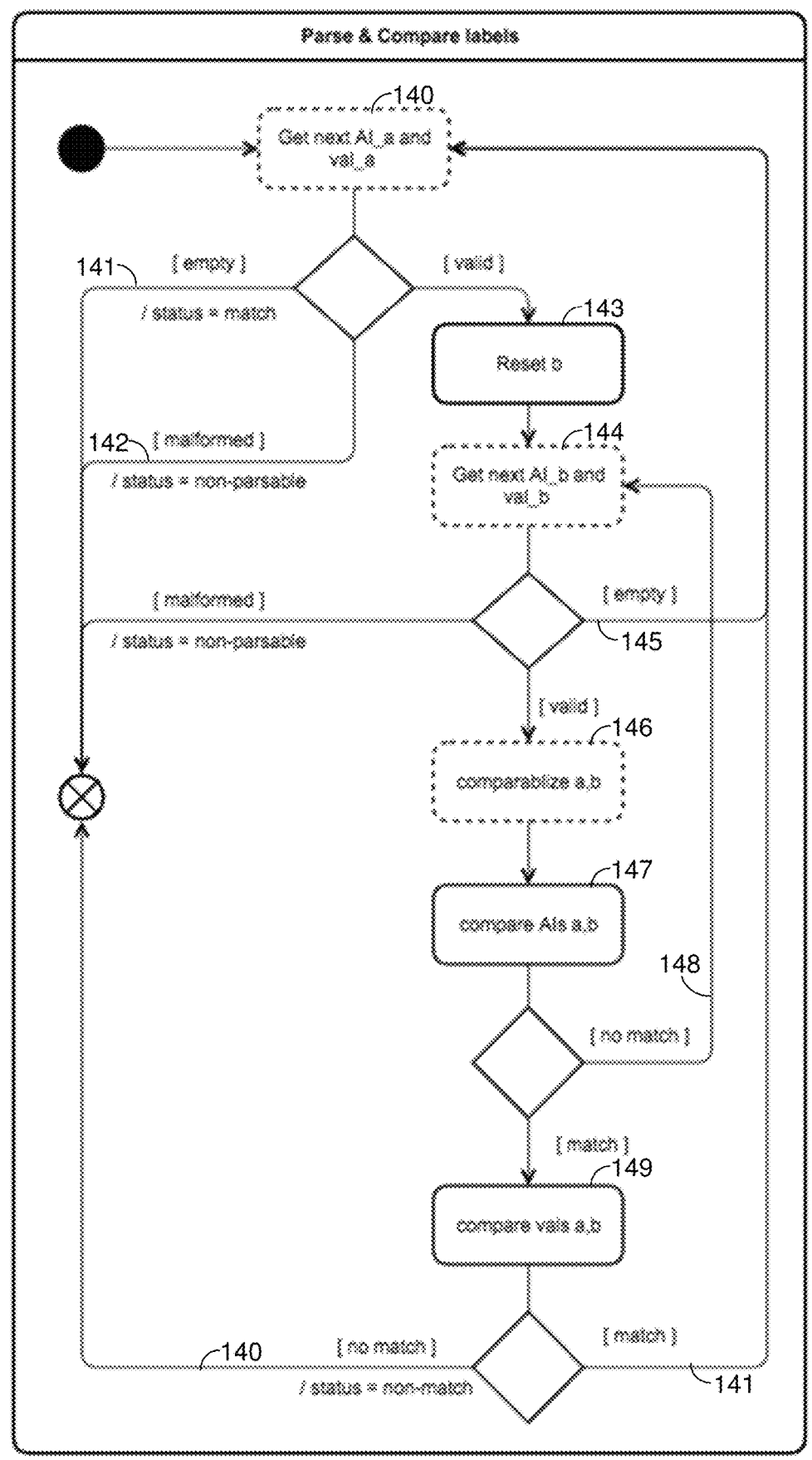

FIG. 14 details the comparison of Application Identifiers and element values between a cached payload ("b") and the current payload ("a"). The next (i.e., first) Application Identifier in the current label is parsed from the decoded payload ("a"), together with its associated data element (i.e., "AI_a" and "val_a"), per process 140. If this AI or data element is null, the routine terminates (141). If the payload is found to be non-parseable, the routine also terminates (142). Otherwise, a pointer is reset to point to the beginning of the payload "b" read from the cache (143). The next (i.e., first) Application Identifier in the cached label is parsed from its payload, together with its associated data element (i.e., "AI_b" and "val_b"), per process 144. If no further AI nor element value is available to be parsed from the cached string (i.e., the end of that string has been reached), the process returns (145) to process 140—reading the next AI and value from the current string. Otherwise, the AI currently under consideration from the current string, is checked for equivalence with the AI currently under consideration from the cached string. This is shown as two blocks in FIG. 14: a "comparabilize" block 146, and a "compare" block 147. The former block performs any conversion needed to make AIs and data elements comparable (e.g., converting pounds to kilograms, and converting associated AIs accordingly). The latter block compares the "comparabilized" data elements.

If no equivalence is found between the two AIs under consideration (148), the next AI and value are parsed from the cached ("b") string (144), and the process repeats. In contrast, if equivalence is found between the current and cached AIs currently under consideration, then their associated integer values are compared for equivalence (149). If they don't match, then the process can move on. The cached string under consideration isn't an equivalent to the current string; consideration of that cached string can terminate (150). However, if a match was found between the first AI in the current string, and an AI in the cached string, and the associated data elements also match, then the process moves on (151) to consider a next AI and element value in the current string, against AIs and associated element values in the cached string.

It will be recognized that the algorithm detailed by FIG. 14 is insensitive to the order in which Application Identifiers and their associated element values appear in a payload string. The first AI in the current string is checked against the first AI, and then the second AI, and then the third AI, etc., in the cached string. And likewise for subsequent AIs in the current string. Wherever corresponding AIs are found in the different strings, their associated element values are compared for a match.

It will further be recognized that if the current string has an Application Identifier, such as item count (30), which is not found in the cached string, this is not an impediment to the strings being found to be equivalent. In such case, the cached string is analyzed through parts 144, 146, 147, and 148 of the diagram, repeatedly, until all of the AIs in the cached string have been examined. When no matching AI is found, this loop exits via branch 145, and the cached string remains in contention as a potential equivalent. And similarly if the cached string has an AI which is not found in the current string. It is only if an AI is present in the current string, and that AI (or a comparabilized AI) is found in the cached string—and the associated element values do not match—that the cached string is found to be non-equivalent to the current string, per branch 150. (Put another way, a virtual Venn diagram is compiled of the AIs present in each string. Only the common AIs need to correspond in order to find equivalence. The presence of an AI in one string that is absent in the other is of no consequence in the determination.)

Figure 15:
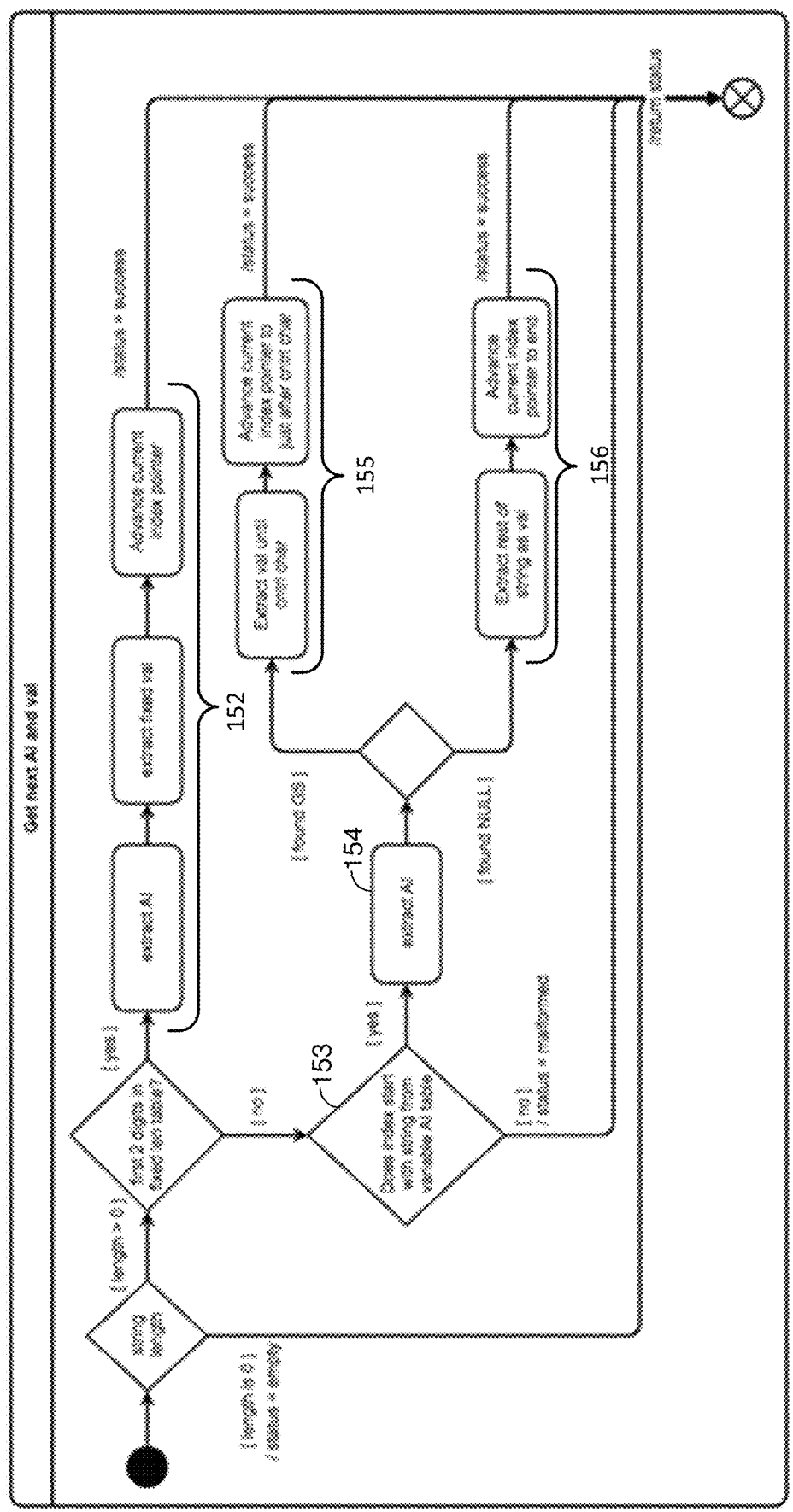

FIG. 15 more particularly details processes 140 and 144 in FIG. 14, by which the next Application Identifier and value is obtained from a string.

In accordance with one particular algorithm, the next (e.g., first) two digits of the string under consideration, indicated by an index pointer, are examined to determine if they match a 2-digit Application Identifier having a fixed length data element (per the GS1 standard). AIs "01" (GTIN: 14 digits) and "16" (sell-by-date: 6 digits) are examples. If so, the AI and data element (value) are parsed (extracted) based on their known lengths, and the index pointer is advanced to the next symbol in the string (i.e., the beginning of the next Application Identifier), per blocks 152.

Otherwise, the digits beginning with the index pointer are examined to see if they match another AI in the GS1 standard, e.g., a 2-digit AI associated with a variable length data element, or a longer AI. If so, such AI is parsed from the string (154). The following digits are examined to see if any is a global separator/FNC1 symbol. If so, digits between the just-parsed AI and this symbol are extracted and serve as the data value for the just-parsed AI, and the index pointer is advanced to the next symbol in the string (i.e., the beginning of the next Application Identifier), per blocks 155. Otherwise, the remainder of the string (up to the max length allowed for that AI) is taken to be the last data value in the string, and all of its digits are taken to be the element value for the just-parsed Application Identifier. The index pointer is again advanced, e.g., to the end of the string (156.)

Figure 16:
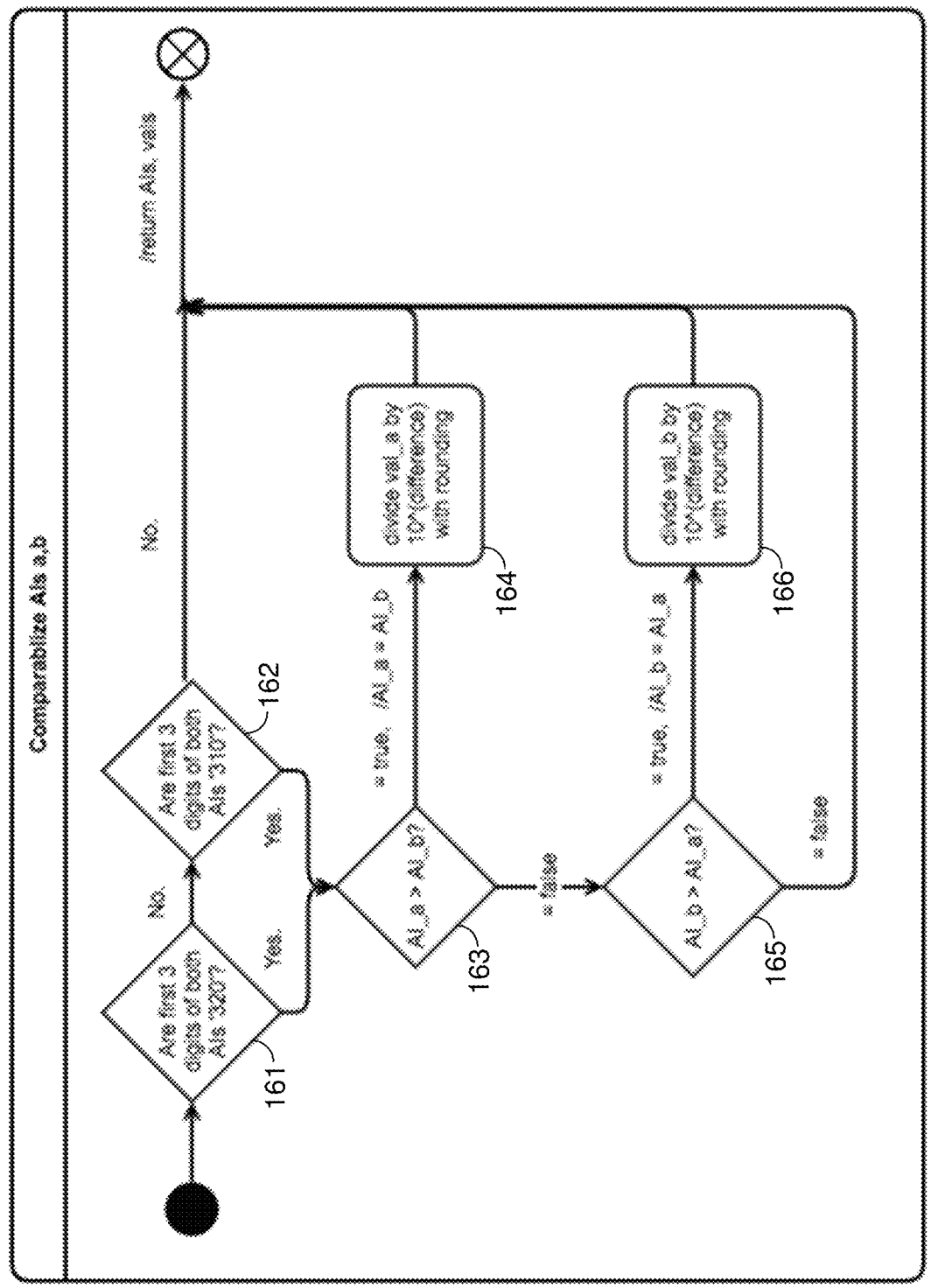

FIG. 16 details the algorithm for "comparabilizing" AIs, used in FIG. 14. The algorithm first checks (161) whether the AIs both begin with "320," indicating a weight in pounds. If not, it checks (162) whether both AIs begin with "310," indicating a weight in kilograms. If not, the process terminates; no comparabilizing is performed in this illustrative embodiment. However, if either of these conditions is met, the algorithm next checks (163) to see whether the AI from the current string "a," is larger than the AI from the cached string "b." For example, the former may be 3203—indicating 3 digits after the decimal point, and the latter may be 3202—indicating 2 digits after the decimal. In this case, the element value associated with the 3203 AI (say, 010126, for 10.126 pounds) is divided by ten, and rounded (164), yielding 1013 (regarded as an integer for comparison purposes). This number expresses the element value that will be associated with an equivalent 3202 AI, i.e. 001013, when it is regarded as an integer. (It will be recognized that weights of different decimal precision are normalized to the lower-precision for comparison.)

If the "a" AI is not larger than the "b" AI, the algorithm checks to see (165) if the opposite is true: is the "a" AI less than the "b" AI. If so, the "b" element value is divided by ten and rounded (166). It is then regarded as an integer and compared with the counterpart element value for the "a" string.

If the AIs are equal (i.e., 3202=3202, 3203=3203, 3102=3102, or 3103=3103), then no adjustment of an element value is required.

The algorithm of FIG. 16 "comparabilizes" two weights in the same measurement system: pounds or kg. Corresponding algorithms (not illustrated) employ similar processes to comparabilize weights in different measurement systems. It will be recognized that there are eight such cases. In one illustrative embodiment, each leads to adjustment of the larger element string, taken as an integer, by a corresponding factor, as shown in Table 1:

TABLE 1

| Current AI ("a") | Cached AI ("b") | Divide larger element value by: |
| --- | --- | --- |
| 3202 (lbs - 2 digits) | 3102 (kg - 2 digits) | 2.204618182 |
| 3202 (lbs - 2 digits) | 3103 (kg - 3 digits) | 4.535932835 |
| 3203 (lbs - 3 digits) | 3102 (kg - 2 digits) | 22.04618182 |
| 3203 (lbs - 3 digits) | 3103 (kg - 3 digits) | 2.204618182 |
| 3102 (kg - 2 digits) | 3202 (lbs - 2 digits) | 2.204618182 |
| 3102 (kg - 2 digits) | 3203 (lbs - 3 digits) | 22.04618182 |
| 3103 (kg - 3 digits) | 3202 (lbs - 2 digits) | 4.535932835 |
| 3103 (kg - 3 digits) | 3203 (lbs - 3 digits) | 2.204618182 |

To illustrate, in the first of the eight listed cases, the 2-digit weight in pounds, expressed by the current "a" element value, may be 001213 (12.13 pounds), and the 2 digit weight in kg expressed by the cached "b" element value may be 000550 (5.5 kg). Dividing 1213 by the stated factor of 2.204618182 yields 550.21. Rounding yields 550—a equal to the "b" element value, when the compare operation 147 of FIG. 14 is performed.

Digimarc's encoding of the GTIN, sell-by date, weight, item count, and price data fields varies from that specified by GS1. For example, in the encoding format used with fresh foods, Digimarc conveys only GTIN-13 identifiers. (GTIN-14 serves different applications, which don't involve retail point-of-sale scanning.) Moreover, a Digimarc Barcode indicia does not encode the final check digit of the GTIN. Digimarc's encoding strategy has other safeguards against errors, so the check digit is not needed. Thus, a GTIN is encoded with just 12 digits. (When a Digimarc barcode is read by a scanner, the detector module re-computes the check digit from the 12 bits, and appends it to the GTIN string, restoring the string to 13 digits.)

Another distinction is that weights are represented up to a maximum of 22.767 pounds if 3 digits after the decimal are required (or 227.67 pounds, if only two digits after the decimal are required). In contrast, GS1 standards theoretically allow weights up to 999.999 kg to be represented, or 2204.62 pounds.

Item count is also constrained. Item counts up to 99 are permitted. In contrast, GS1 standards allocate up to 8 digits for this field, allowing counts up to 99,999,999.

Digimarc also represents sell-by dates differently. Instead of allocating six digits in YYMMDD format, to the field, Digimarc represents the date in an epoch-style format: the number of days since the start of 2016. This enables dates from Jan. 1, 2016 to May 8, 2106, to be represented. (As with GTIN, the detector module converts the Digimarc representation of the data to GS1 style, i.e., YYMMDD, after decoding.)

Digimarc's encoding on labels and packages is generally imperceptible, or at least inconspicuous. The less data that the Digimarc barcode conveys, the easier it is to keep the marking inconspicuous. The just-noted variations from the GS1 data representations enable Digimarc to encode a label for fresh food items (conveying GTIN, price, weight or item count, and sell-by date) in just 98 bits. 5 bits comprise a preamble that specify the encoding format (e.g., indicating whether any weight expressed in the payload is pounds or kilograms, and how many digits follow the decimal point). The next 40 bits are used to represent the 12 digits of GTIN data. The final 53 bits of the payload represent the decimal weight in pounds (or the item count), together with the price and sell-by date.

To further conserve payload space, the GS1 Application Identifiers are not literally encoded in the payload data. Rather, they are inserted on the receiving end of the process, by the decoder 83—after the element values have been decoded.

The weight is discerned by converting the final 53 payload bits to a decimal counterpart, dividing by 330,000,000,000, and taking the integer part. For example, if the final 53 bits are:

00000011111100101101100101100101001001111101010000011

The decimal counterpart is 138,930,056,133,251. Dividing by 330,000,000,000 and taking the integer part yields 421. If the preamble indicates the payload encodes the weight with 3 digits after the decimal point, this indicates the weight is 0.421 pounds.

If the integer part produced by this algorithm exceeds 22767, this indicates that the payload conveys an item count instead of a weight. In such case, the item count is the just-referenced integer part, minus 22767.

The price is discerned by taking the decimal counterpart of the 53 final bits, computing its modulo-330,000,000,000 value, dividing the result by 33,000, and taking the integer part. In the above example, the modulo operation yields 56,133,251. Dividing this value by 33,000 yields 1701.007606. The price is expressed with two digits after the decimal point, so here is equal to $17.01.

The sell-by-date is discerned by taking the just-computed modulo value, and performing a second modulo operation, this one mod-33,000. Mod-33,000(56,133,251) yields a value of 251. As noted, this indicates the number of days since the start of 2016, i.e., Sep. 8, 2016. Expressed in GS1 format, the detector 83z expresses this data as 160908.

The detector pre-pends a "0" to the GTIN, computes the check bit corresponding to the decoded 12-digit GTIN and post-pends it, inserts the 01, 3203, 3922 and 16 Application Identifiers, and outputs a corresponding element string. If the 40 bits convey a GTIN of 123456789012, the detector 83z computes a check bit of 8, and may output a string like:

(01)01234567890128(3203)000421(3922)1701<GS>
(16)160908

(There is actually some "headroom" available in the 40 bits used to represent the 12 digits of GTIN data. 12 digits can range up to 999,999,999,999. But 40 bits can represent up to 1,099,511,627,776. The difference, or 99,511,627,777, is a coding space in which a UPC-E identifier can be represented instead of a GTIN-14 identifier. If the decimal equivalent of the 40 bits exceeds 999,999,999,999, then the excess value can be used to represent a UPC-E identifier.)

Sometimes a package will have a DataBar code that represents data in addition to that conveyed by a Digimarc Barcode indicia found on the same package. For example, the DataBar code might include a batch or lot number (Application Identifier "10") that is omitted in the Digimarc Barcode indicia. Similarly, a Digimarc Barcode indicia may include an Application Identifier datum, such as weight (3203), that is omitted in a DataBar code in the same package.

Digimarc Barcode Indicia

Technical details of the Digimarc Barcode indicia are provided in applicant's published patent applications. A brief review follows: FIG. 17 is a diagram illustrating a process for constructing such a code. In this embodiment, separate variable payload and reference signal components are generated and then combined. The payload is a sequence of data symbols, which each represent two or more (binary or M-ary) message symbol values. The integer value, M, in the term, M-ary, is the number of possible symbol values per symbol element. For example, in the case of M=3, the symbol values have one of three states, such as 1, 0 and −1, or correspond to signal feature values of three different quantization bins. The latter refers to a modulation scheme where a feature value of the host image is quantized to one of the quantization bins corresponding to the symbol value. To make the payload more robust, it is encoded redundantly using a combination of error correction, error detection, repetition and carrier signals. The processing in block 30 transforms the payload into a robust encoded payload component in which symbols of the payload are conveyed in plural elements of the encoded payload component. These elements form a payload signal waveform with a spatial arrangement and amplitude.

The reference signal component is a signal used to detect the optical code within the output image and perform geometric synchronization. The processing in block 32 generates the reference signal component by specifying its signal waveform properties, such its spatial arrangement and amplitude. An example of this type of optical code, with encoded payload and reference signal is described in U.S. Pat. No. 6,590,996 and in pending application Ser. No. 16/141,587, filed Sep. 25, 2018, which are incorporated by reference.

In block 34, the embodiment assigns a priority to elements of the encoded payload and reference signal components. This is implemented by applying a weighting to the elements according to the assigned priority. For example, the method multiplies amplitude values of signal elements by a weighting factor proportional to the priority of the optical code component of those elements.

The embodiment of FIG. 17 then constructs the optical code into a two-dimensional spatial image representation in block 36.

FIG. 18 is a diagram illustrating another process for constructing such a code. This is a variant of FIG. 17 in which the reference signal component is formed in the arrangement of encoded payload component. In block 40, this embodiment generates an encoded payload component. This approach may use similar error correction coding and modulating onto a carrier signal as the embodiment of FIG. 17. Then, in block 42, this embodiment arranges the encoded payload elements into a pattern that forms a reference signal component. An example of this approach is described in U.S. Pat. No. 9,747,656, which is incorporated by reference. In a variant of this approach, encoded payload elements are spatially interleaved with fixed reference signal elements. The fixed elements form a pattern of the reference signal component.

To assign priority to the components in block 44, the embodiment weights signal elements of the encoded payload and fixed elements. This approach produces a spatial pattern of weighted elements, arranged so as to form a reference signal (46).

Figures 19, 20:
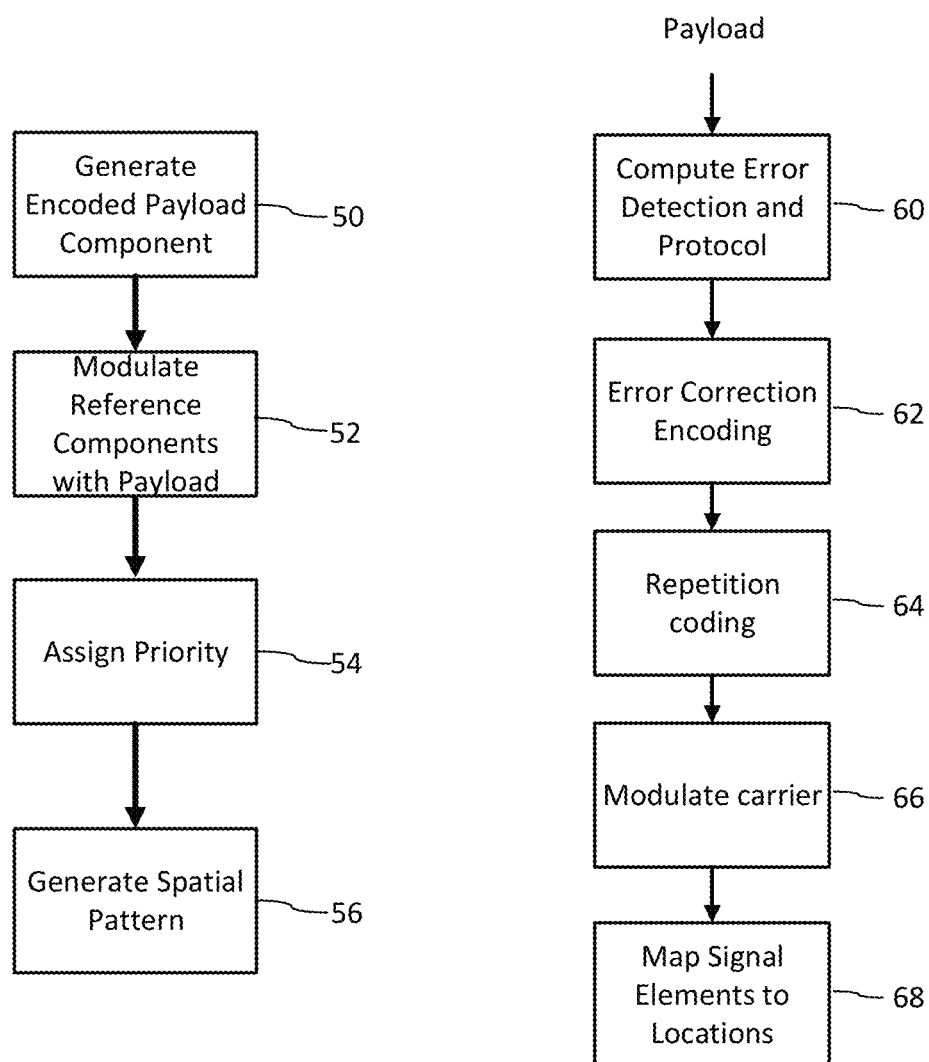

FIG. 19 is a diagram illustrating another process for constructing an optical code. This is another variant of FIG. 17 in which the reference signal component serves as a carrier for encoded payload signal elements. In block 50, this embodiment generates an encoded payload component. For example, the sequence of payload components are error correction encoded by converting the sequence of payload symbols into a longer sequence of encoded symbols using error correcting codes such as block and/or convolution error correcting codes. Some examples of block codes include (e.g., Bose—Chaudhuri—Hocquenghem (BCH), Reed-Solomon codes).

In block 52, the embodiment modulates components of a reference signal with elements of the encoded payload signal. In one implementation, the reference signal comprises a collection of sine waves, each with a phase value. The payload is encoded by shifting the phase of a sine wave according to the value of an encoded payload signal element. In one protocol, the encoded payload elements are binary, meaning that they have one of two different values per element. One binary value is represented with zero phase shift and the other by a phase shift of $\pi$ (180 degrees) of the corresponding sine wave. In other protocol variants, the encoded payload signal is M-ary, with M>2. The value of M is limited by robustness constraints, as the higher it is, the more difficult it is to distinguish among different symbol values encoded in an image feature. The encoded payload is modulated onto the reference signal carrier component by shifting the phase into one of M corresponding phase shift states (e.g., 0, $\pi/2$, $\pi$, or $3\pi/2$). This may be implemented as form of quantization based modulation, where the phase of the reference signal component is quantized to fall within the phase shift bin corresponding to the encoded payload symbol.

Not all components of the reference signal need to be modulated with payload signal. Instead, some subset of the reference signal may remain un-modulated, and this un-modulated component serves as a reliable signal for a first stage of detection. For example, the reference signal may be comprised of 200 sine waves, with a subset (e.g., 40-60) remaining fixed, and the others available for modulation by a corresponding payload signal element.

Another approach to modulating a reference signal is on-off keying of reference signal components. In this approach, a subset of reference signal sine waves are fixed, and the remainder are modulated to convey data using on-off keying. In this on-off keying, encoded payload symbols are encoded by including or not, a sine wave at predetermined frequency location. Each encoded payload element is mapped to a frequency location within an image tile. Where the payload element is a first binary value (e.g., 0 or −1), the sine wave for that element is not included. Conversely, where the payload element has a second binary value (e.g., 1), the sine wave for that element is included.

In block 54, the embodiment assigns priority to the optical signal components. This is implemented for example, by applying a scale factor to selected sine wave components according to priority. Higher priority signal components are given greater weight by multiplying by a larger scale factor. Additionally, different scale factors may be applied to the fixed vs. modulated reference signal components to provide a greater relative priority to parts of the reference signal that are modulated or fixed.

In block 56, the embodiment generates a spatial pattern of the optical code with its modulated reference signal components. In the case of the sine wave embodiment, there are alternative methods to generate the spatial pattern. One alternative is to apply an inverse frequency domain transform on the complex components in the frequency domain, such as an inverse Fast Fourier Transform (FFT). Another alternative starts with spatial domain waveforms of each sine wave component, and adds them together to form the spatial pattern. As an alternative to sine waves, other carrier signals, such as orthogonal arrays, which have good autocorrelation but low cross correlation, may be used. These orthogonal arrays map to locations in a two-dimensional image tile.

The output of each of the optical code generators in FIGS. 17-19 is a spatial domain image block. The pixel values of the block are multi-valued, e.g., eight bits per pixel. This image block may be used as signal tile, which is repeated and merged with host image content of a host image to form an output image. The output image is a label or package design, which is rendered onto a substrate by a printer or other marking equipment (embosser, engraver, etcher, or the like). The signal components are prioritized according to the assigned priority. This priority enables the optical code to be filled into spatial areas of the host image design according to a signal priority and dot density and spacing that optimizes robustness and visual quality constraints.

We now detail sub components of the optical code generators of FIGS. 17-19.

FIG. 20 is a diagram illustrating a method of encoding a variable digital payload to be conveyed in an optical code. This section explains additional examples of how to generate encoded payload components in the embodiments discussed previously. In processing module 60, the data payload is processed to compute error detection bits, e.g., such as a Cyclic Redundancy Check, Parity, check sum or like error detection message symbols. Additional fixed and variable messages used in identifying the payload format and facilitating detection, such as synchronization signals may be added at this stage or subsequent stages.

Error correction encoding module 62 transforms the message symbols into an array of encoded message elements (e.g., binary or M-ary elements) using an error correction method. Examples include block codes, BCH, Reed Solomon, convolutional codes, turbo codes, etc.

Repetition encoding module 64 repeats the string of symbols from the prior stage to improve robustness. Repetition encoding may be removed and replaced entirely with error correction coding. For example, rather than applying convolutional encoding (e.g., at ⅓ rate) followed by repetition (e.g., repeat three times), these two can be replaced by convolution encoding to produce a coded payload with approximately the same length.

Next, carrier modulation module 66 takes message elements of the previous stage and modulates them onto corresponding carrier signals. For example, a carrier might be an array of pseudorandom signal elements, with equal number of positive and negative elements (e.g., 16, 32, 64 elements), or other waveform, such as sine wave or orthogonal array. In the case of positive and negative elements, the payload signal is a form of binary antipodal signal. It also may be formed into a ternary (of 3 levels, −1, 0, 1) or M-ary signal (of M levels). These carrier signals may be mapped to spatial domain locations or spatial frequency domain locations. Another example of carrier signals are the above-described sine waves, which are modulated using a modulation scheme like phase shifting, phase quantization, and/or on/off keying.

The carrier signal provides additional robustness, as it spreads the encoded message symbol over the carrier. As such, the use of larger carrier arrays reduces the redundancy employed in error correction and/or the need for repetition code. Thus, the error correction codes, repetition and carrier signals may be used in various combinations to produce an encoded payload signal for a tile that achieves the desired robustness and signal carrying capacity per tile.

Mapping module 68 maps signal elements of the encoded payload signal to locations within an image block. These may be spatial locations within an image tile. They may also be spatial frequency locations. In this case, the signal elements are used to modulate frequency domain values (such as magnitude or phase). The resulting frequency domain values are inverse transformed into the spatial domain to create a spatial domain signal tile.

Mapping module 68 also maps a reference signal to locations in the image block. These locations may overlap or not the locations of the payload. The encoded payload and reference signal are signal components. These components are weighted and together, form an optical code signal.

To accurately recover the payload, an optical code reader must be able to extract estimates of the encoded data payload signal elements at their locations within an image. This requires the reader to synchronize the image under analysis to determine the tile locations, and data element locations within the tiles. The locations are arranged in two dimensional blocks forming each tile. The synchronizer determines rotation, scale and translation (origin) of each tile.

The optical code signal comprises an explicit and/or implicit reference signal. An explicit reference signal is a signal component separate from the encoded payload that is included with the encoded payload, e.g., within the same tile. An implicit reference signal is a signal formed with the encoded payload, giving it structure that facilitates geometric synchronization. Because of its role in geometric synchronization, we sometimes refer to the reference signal as a synchronization signal. Examples of explicit and implicit synchronization signals are provided in our U.S. Pat. Nos. 6,614,914, and 5,862,260, which are incorporated by reference.

In particular, one example of an explicit synchronization signal is a signal comprised of a set of sine waves, with pseudo-random phase, which appear as peaks in the Fourier domain of the suspect signal. See, e.g., U.S. Pat. Nos. 6,590,996, 6,614,914, and 5,862,260, describing use of a synchronization signal in conjunction with a robust data signal. Also see U.S. Pat. No. 7,986,807, which is incorporated by reference.

Our US Publications 20120078989 and 20170193628, which are incorporated by reference, provide additional methods for detecting a reference signal with this type of structure and recovering rotation, scale and translation. US 20170193628 provides additional teaching of synchronizing an optical code reader and extracting a digital payload with detection filters, even where there is perspective distortion.

Examples of implicit synchronization signals, and their use, are provided in U.S. Pat. Nos. 6,614,914, 5,862,260, 6,625,297, 7,072,490, and 9,747,656, which are incorporated by reference.

Figure 1:
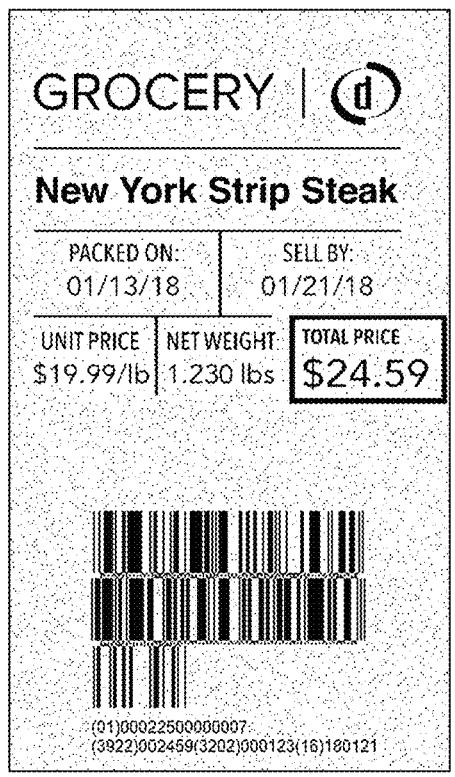
FIG. 1 is a food label bearing both a conventional (DataBar) barcode, and a Digimarc Barcode indicia.
Figure 1A:
FIG. 1A is FIG. 1 overlaid with markings showing a block encoding 98 binary bits that is repetitively tiled across the label.

Additional information on creating and decoding patterns that can serve as Digimarc Barcode indicia is found in U.S. Pat. Nos. 9,959,587, 9,747,656, 9,635,378, 9,521,291, publications 20170024840 and 20190171856, and pending application Ser. No. 16/405,621, filed May 7, 2019, which are incorporated by reference. The latter three documents particularly focus on embodiments in which the indicia comprises a sparse pattern of dots on a contrasting background, e.g., as shown in FIG. 1.

As detailed in the cited documents, one arrangement creates a sparse code by applying a thresholding operation to a dense code, which combines payload and reference signal components, to identify locations of extreme low values (i.e., dark). These locations in the dense code are then marked in a sparse block. The threshold level establishes the print density of the resulting sparse mark.

Another arrangement identifies the darkest elements of a reference signal, and logically-ANDs these with dark elements of the payload signal, to thereby identify locations in a sparse signal block at which marks should be formed. A threshold value can establish which reference signal elements are dark enough to be considered, and this value can be varied to achieve a desired print density.

Still another arrangement employs a reference signal generated at a relatively higher resolution, and a payload signal generated at a relatively lower resolution. The latter signal has just two values (i.e., it is bitonal); the former signal has more values (i.e., it is multi-level, such as binary greyscale or comprised of floating point values). The payload signal is interpolated to the higher resolution of the reference signal, and in the process is converted from bitonal form to multi-level. The two signals are combined at the higher resolution, and a thresholding operation is applied to the result to identify locations of extreme (e.g., dark) values. Again, these locations are marked in a sparse block. The threshold level again establishes the print density of the resulting sparse mark.

Yet another arrangement again employs a reference signal generated at a relatively higher resolution, and a bitonal payload signal generated at a relatively lower resolution. A mapping is established between the two signals, so that each element of the payload signal is associated with four or more spatially-corresponding elements of the reference signal. For each element of the payload signal that is dark, the location of the darkest of the four-or-more spatially corresponding elements in the reference signal is identified. A mark is made at a corresponding location in the sparse block.

A further arrangement is based on a dense multi-level reference signal block. Elements of this signal are sorted by value, to identify the darkest elements—each with a location. These darkest elements are paired. One element is selected from each pairing in accordance with bits of the payload. Locations in the sparse block, corresponding to locations of the selected dark elements, are marked to form the sparse signal.

Arrangements that operate on composite, dense codes can further include weighting the reference and payload signals in ratios different than 1:1, to achieve particular visibility or robustness goals.

Each of these arrangements can further include the act of applying a spacing constraint to candidate marks within the sparse block, to prevent clumping of marks. The spacing constraint may take the form of a keep-out zone that is circular, elliptical, or of other (e.g., irregular) shape. The keep-out zone may have two, or more, or less, axes of symmetry (or none). Enforcement of the spacing constraint can employ an associated data structure having one element for each location in the sparse block. As dark marks are added to the sparse block, corresponding data is stored in the data structure identifying locations that—due to the spacing constraint—are no longer available for possible marking.

In each of these arrangements, the reference signal can be tailored to have a non-random appearance, by varying the relative amplitudes of spatial frequency peaks, so that they are not all of equal amplitude. Such variation of the reference signal appearance has consequent effects on the sparse signal appearance.

These arrangements can also include the act of applying a non-linear filter to a multi-level code (e.g., the original dense code) to identify locations at which forming a mark in the sparse block most effectively gives expression to information represented by unprinted sparse elements. These locations are then given priority in selecting locations at which to make marks in the sparse block.

Operating Environment

The arrangements detailed above are implemented in software instructions or digital circuitry organized into modules. These modules variously include various detector modules, a reconciliation module, etc. The reconciliation module, in turn, includes a promotion module, a parse and compare module, a comparabilize module, etc. Notwithstanding any specific discussion of the embodiments set forth herein, the term "module" refers to software instructions, firmware or circuitry configured to perform any of the methods, processes, functions or operations described herein.

Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in MATLAB, C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as computer processors comprising one or more individual instruction processing cores, state machine circuitry, or firmware that stores instructions executed by programmable circuitry.

Implementation can additionally, or alternatively, employ special purpose electronic circuitry that has been custom-designed and manufactured to perform some or all of the component acts, as an application specific integrated circuit (ASIC). To realize such an implementation, the relevant module(s) (e.g., detector modules, reconciliation module, etc.) are first implemented using a general purpose computer, using software such as MATLAB (from Mathworks, Inc.). A tool such as HDLCoder (also available from MathWorks) is next employed to convert the MATLAB model to VHDL (an IEEE standard) or Verilog. The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

HDLCoder may also be used to create a Field Programmable Gate Array implementation. The FPGA may be used to prototype the ASIC or as an implementation in a FPGA chip integrated into an electronic device.

Figure 21:
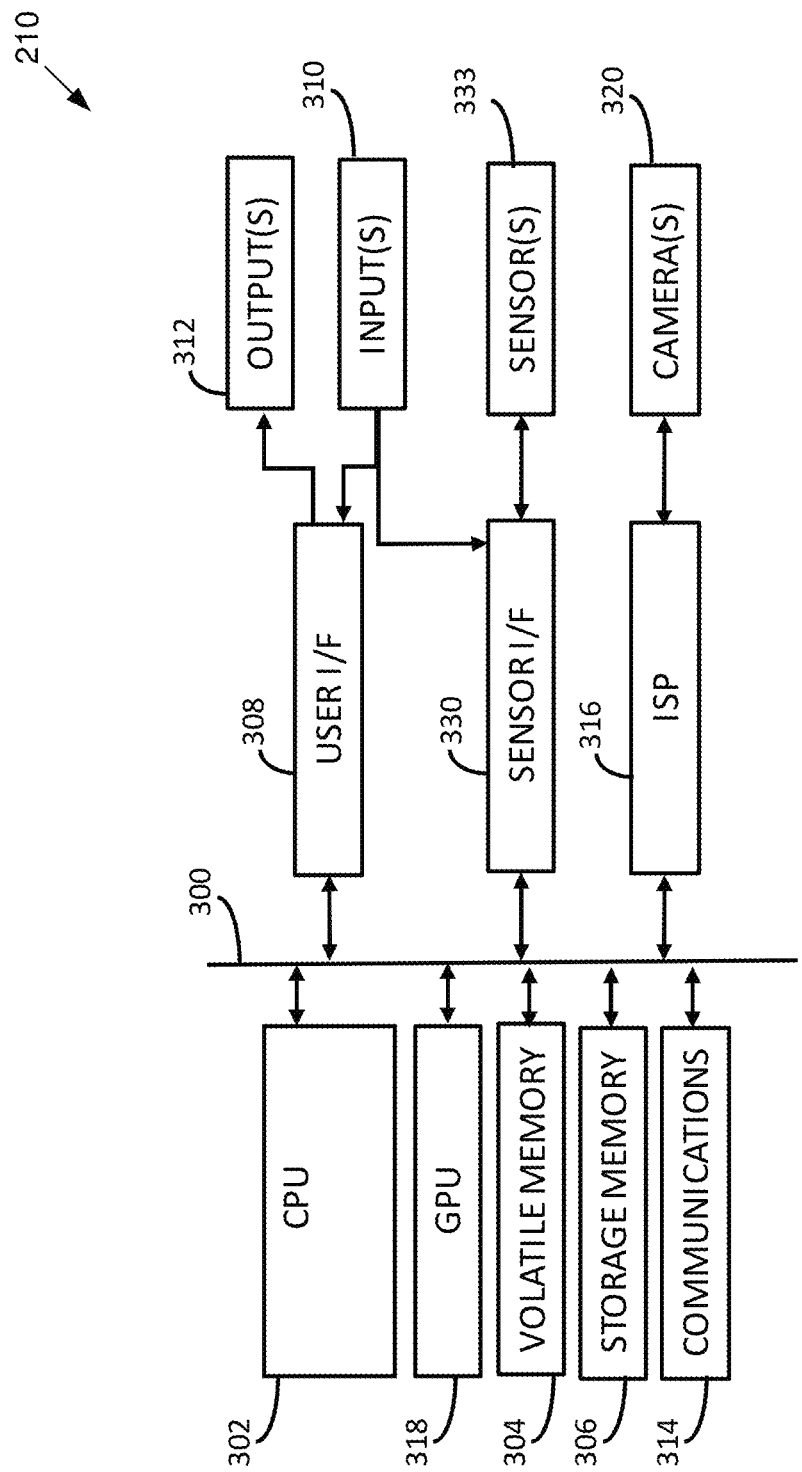
FIG. 21 is a block diagram of an electronic device that can be configured to practice the detailed arrangements.

For the sake of illustration, FIG. 21 is a diagram of an electronic device 210 in which the components of the above optical code generator, inserter, optimizer and decoder embodiments may be implemented. It is not intended to be limiting, as the embodiments may be implemented in other device architectures or electronic circuitry. FIG. 21 represents a computer in which program instructions for, e.g., decoding symbologies and reconciling payloads, are stored and executed to carry out methods described in this document. It also represents special purpose computer systems, like a point-of-sale scanner system Like more general purpose computers and mobile devices (e.g., smartphones and tablets), a POS scanner system includes memory for storing firmware implementations of these methods and one or more processors for executing them. They may also include above-referenced FPGA or ASIC implementations of the detector modules, reconciliation module, etc.

The depicted device 210 includes a bus 300 to which many devices, modules, etc., (each of which may be generically referred as a "component") are communicatively coupled. The bus 300 may combine the functionality of a direct memory access (DMA) bus and a programmed input/output (PIO) bus. In other words, the bus 300 may facilitate both DMA transfers and direct CPU read and write instructions. In one embodiment, the bus 300 is one of the Advanced Microcontroller Bus Architecture (AMBA) compliant data buses. Although FIG. 21 illustrates an embodiment in which all components are communicatively coupled to the bus 300, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

Device 210 also includes a CPU 302. The CPU 302 may be a microprocessor, mobile application processor, etc., known in the art (e.g., a Reduced Instruction Set Computer (RISC) from ARM Limited, the Krait CPU product-family, a X86-based microprocessor available from the Intel Corporation including those in the Pentium, Xeon, Itanium, Celeron, Atom, Core i-series product families, etc.). The CPU 302 runs an operating system of the electronic device, runs application programs and, optionally, manages the various functions of the electronic device. The CPU 302 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device.

The depicted device may also include a volatile memory 304 electrically coupled to bus 300. The volatile memory 304 may include, for example, any type of random access memory (RAM). Although not shown, the device may further include a memory controller that controls the flow of data to and from the volatile memory 304.

Device 210 may also include a storage memory 306 connected to the bus. The storage memory 306 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the technology, the storage memory 306 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like.

Also connected to the bus 300 is a user interface module 308. The user interface module 308 is configured to facilitate user control of the electronic device, both by a human technician, and also by other devices with which device 210 is used (e.g., a point of sale terminal). Thus the user interface module 308 may be communicatively coupled to one or more input devices 310. An input device 310 can, for example, include a button, knob, GUI control, etc.

The user interface module 308 may also be configured to indicate, to the user, the effect of the user's control of the electronic device, or any other information related to an operation being performed by the electronic device or function otherwise supported by the electronic device. Thus the user interface module 308 may also be communicatively coupled to one or more output devices 312. A user output device 312 can, for example, include a display (e.g., a liquid crystal display (LCD), a light emitting diode (LED) display, an active-matrix organic light-emitting diode (AMOLED) display, an e-ink display, etc.), a printer, a loud speaker, or the like or any combination thereof.

Generally, the input devices 310 and output devices 312 are an integral part of the electronic device; however, in alternate embodiments, any input device 310 (e.g., a keyboard, etc.) or user output device 312 (e.g., a display) may be a physically separate device that is communicatively coupled to the electronic device (e.g., via a communications module 314).

Although the user interface module 308 is illustrated as an individual component, it will be appreciated that the user interface module 308 (or portions thereof) may be functionally integrated into one or more other components of the electronic device (e.g., the CPU 302, the sensor interface module 330, etc.).

Also connected to the bus 300 is an image signal processor 316 and a graphics processing unit (GPU) 318. The image signal processor (ISP) 316 is configured to process imagery (including still-frame imagery, video imagery, or the like or any combination thereof) captured by one or more cameras 320, or by any other image sensors, thereby generating image data. General functions typically performed by the ISP 316 can include Bayer transformation, demosaicing, noise reduction, image sharpening, or the like or combinations thereof. The GPU 318 can be configured to process the image data generated by the ISP 316, thereby generating processed image data. General functions performed by the GPU 318 include calculating geometric transformations (e.g., rotation, translation, etc.) into different coordinate systems, etc. and sending image data to other components of the electronic device (e.g., the volatile memory 304) via bus 300. Image data generated by the ISP 316 or processed image data generated by the GPU 318 may also be accessed by the user interface module 308, where it can be converted into one or more suitable signals that may be sent to a user output device 312 such as a display.

The communications module 314 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 314 may include one or more microprocessors, digital signal processors or other microcontrollers, programmable logic devices, or the like or combination thereof. Optionally, the communications module 314 includes cache or other local memory device (e.g., volatile memory, non-volatile memory or a combination thereof), DMA channels, one or more input buffers, one or more output buffers, or the like or combination thereof. In some embodiments, the communications module 314 includes a baseband processor (e.g., that performs signal processing and implements real-time radio transmission operations for the electronic device).

Also connected to the bus 300 is a sensor interface module 330 communicatively coupled to one or more sensors 333. As noted, device 210 can comprise one or more cameras. Moreover, it can include a scale for weighing items (such as in a scale used to weigh items at a point of sale terminal). Although separately illustrated in FIG. 21, any camera 320 can also be considered a sensor 333. Generally, a sensor 333 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 333 coupled to the sensor interface module 330 are an integral part of device 210; however, in alternate embodiments, one or more of the sensors may be physically separate devices communicatively coupled to the electronic device (e.g., via the communications module 314). To the extent that any sensor 333 can function to sense user input, then such sensor 333 can also be considered a user input device 310.

The sensor interface module 330 is configured to activate, deactivate or otherwise control an operation (e.g., sampling rate, sampling range, etc.) of one or more sensors 333 (e.g., in accordance with instructions stored internally, or externally in volatile memory 304 or storage memory 306, ROM, etc., in accordance with commands issued by one or more components such as the CPU 302, the user interface module 308). In one embodiment, sensor interface module 330 can encode, decode, sample, filter or otherwise process signals generated by one or more of the sensors 333. In one example, the sensor interface module 330 can integrate signals generated by multiple sensors 333 and optionally process the integrated signal(s). Signals can be routed from the sensor interface module 330 to one or more of the aforementioned components of the electronic device (e.g., via the bus 300). In another embodiment, however, any signal generated by a sensor 333 can be routed (e.g., to the CPU 302), before being processed.

Generally, the sensor interface module 330 may include one or more microprocessors, digital signal processors or other microcontrollers, programmable logic devices, or the like or any combination thereof. The sensor interface module 330 may also optionally include cache or other local memory device (e.g., volatile memory, non-volatile memory or a combination thereof), DMA channels, one or more input buffers, one or more output buffers, and any other component facilitating the functions it supports (e.g., as described above).

Other suitable operating environments are detailed in the incorporated-by-reference documents.

Concluding Remarks

Having described and illustrated the principles of the technology with reference to specific implementations, it will be recognized that the technology can be implemented in many other, different, forms.

For example, while the detailed arrangement particularly considered just two different symbologies in the stream of image frames output from the camera and decoded by the detectors, in other embodiment three or more symbologies may be present—all of them reconciled and treated as detailed herein.

Similarly, while the emphasis of the detailed description has been on items marked with both a holographic code and a DataBar code, it will be recognized that the same principles are applicable for any pair of machine-readable codes found on the same item, including codes that are not disparate in form, yet convey different but semantically equivalent payload data.

While repeated reference was made to a 150 millisecond window interval, it will be understood that this is an arbitrary value. Longer or shorter values can naturally be used. A user interface control, such as a software dialog, can be employed to enable a technician to set the desired interval. By setting the interval to zero, the reconciliation function can be effectively disabled.

In some embodiments, each cached payload is stored with a timestamp indicating the current time—when the payload was decoded. In other embodiments, each payload is stored with a timestamp indicating a time in the future after which the cache entry will be stale, i.e., the time the payload was decoded plus 150 milliseconds. The processes dependent on such timing can be adapted to whichever choice of data is stored in a particular embodiment.

In the detailed embodiment, the cache stores the raw payloads provided from the detectors 83. In other embodiment, these payloads can be varied, e.g., by "promoting" the decoded GTINs to 14 digits, with a "01" Application Identifier prefix, and caching the promoted counterparts. Similarly, the payloads can be parsed and stored in parsed form, avoiding the possible need to parse some stored payloads multiple times during operation.

While the preferred embodiment does not cache every payload that is decoded (but instead caches every payload that is output from the reconciliation module), this is not essential. Every payload that is decoded can be cached as well.

When encountering a second payload that is semantically-equivalent to an earlier payload, the detailed arrangement outputs the earlier payload a second time. If the first payload was a Digimarc Barcode indicia payload, and the second was a DataBar payload, the Digimarc Barcode indicia payload is output twice. If the first payload was a DataBar payload and the second was a Digimarc Barcode payload indicia, the DataBar payload is output twice. But in other implementations, other conventions can be used. For example, all payloads may be converted to a common standard. If the standard includes an Application Identifier (e.g., for weight) that is missing in a decoded payload, the converted payload includes a zero in that field. If the standard omits an Application Identifier (e.g., for batch number) that is included in a decoded payload, the converted payload simply does not express that Application Identifier. Payloads of various composition are thus converted into a common standard.

In the detailed embodiment, the cache includes context data indicating the data carrier from which each output payload was decoded (e.g., DataBar code, Digimarc Bar-Code indicia, DataMatrix code, QR code, UPC-A, etc.). In other embodiments, context data other than, or in addition to, the data carrier type can be cached. For example, the cache entry for each payload can specify the camera that captured the image from which the data carrier was decoded (e.g., vertical tower or horizontal platen in a biopic scanner), or the illumination under which the camera frame was captured (e.g., strobed red light, strobed blue and yellow light, ambient light, etc.), etc.

Different actions may be taken, depending on the context associated with a particular payload. For example, the detailed behavior of changing a second payload to match a first can be employed when the two semantically-equivalent payloads are found in different contexts, e.g., with one decoded from a DataBar code and the other decoded from a Digimarc Barcode indicia. But, if first and second semantically-equivalent payloads are found in the same context (e.g., both decoded from DataBar codes), then such changing of the second payload to match the first may be omitted. In such case the system can conclude that the payloads likely were decoded from first and second physical objects. (For two different printed DataBar codes to have been decoded, two physical items were most likely scanned, as no single item would conveys two different DataBar codes.) In such case, the first payload can be output, followed by the second, different, payload—without any change due to semantic equivalence.

The double-read protection module 87 shown in FIG. 8 can be a stand-alone module in the scanner software, or it can be integrated into the data reconciliation module 86. In the latter case, when two semantically equivalent payloads are decoded within the 150 millisecond time window, instead of outputting the first payload twice, only the first payload is output. The second is suppressed. In still other embodiments, the double-read protection module can be included in the point of sale terminal.

In the detailed "promoting" algorithm of FIG. 13, only the GTIN (Application Identifier 01) was zero-padded to bring up to the maximum GS1-specified length. In other embodiments, zero-padding can similarly be applied to other element values, e.g., zero-padding any item count element value to 15 digits, etc.

While applicant detailed one particular decoding arrangement for the Digimarc Barcode indicia, other arrangements can naturally be used. On such protocol encodes either a full GTIN-14, or a UPC-E identifier, in 47 bits of the encoded binary data. (As note, if these bits represent a decimal value below 99,999,999,999,999, it is taken to be a GTIN-14. If they represent a larger value, then the excess is taken to be a UPC-E identifier. In both cases, the decimal equivalents are zero-padded on the left to bring up to full length.) The following 49 bits convey a user-defined string—with the first of these 49 bits indicating whether the string is to be interpreted as decimal digits or ASCII values. A preamble of 2 bits indicates a sub-type for the protocol.

Another protocol uses a 98-bit binary message to convey a GS1 serialized GTIN (SGTIN). Such a payload can again start with a 2-bit preamble indicating a sub-type (with a value of 00 indicating a GS1 SGTIN-96 type). The next 3 bits represent the GS1 filter value (e.g., with a value of 001 indicating a point of sale trade item). The next 3 bits represent the GS1 partition value (based on the number of digits in the company prefix). Then-follows 44 bits representing the company prefix, an indicator digit, and an item reference. The final 38 bits comprise a serial number.

Still another protocol uses a 64-bit binary message to convey a GS1 asset identifier. The first 6 bits indicates a sub-type for the payload. The $7^{th}$ bit is reserved. The next 57 bits present the GS1 Global Individual Asset Identifier, namely a company prefix and an individual asset reference.

Yet another protocol employs 47 bits to encode either a GTIN-14 or a UPC-E, as described earlier.

Naturally, many other protocol arrangements can be used, e.g., drawing from the arrangements just-detailed.

While the preferred embodiment uses modulo-based decoding to extract different AI element values from a binary payload, in other embodiments different Application Identifiers can be associated with pre-defined ranges of bits in the binary payload, in which associated data elements are conveyed.

In the detailed embodiment, semantic equivalence was established when the promoted GTINs of current- and cached-payloads matched, together with element values of any corresponding Application Identifiers that were present in both payloads. In a variant embodiment, stricter criteria for equivalence may be employed. For example, certain AIs and data elements must be present and match between to two payloads being compared, e.g., item weight or expiration date.

The detectors in the illustrated embodiment output full payload strings created by decoding the indicia depicted in the camera data. In another embodiment, each detector acts in response to a call through an application programming interface (API). These APIs allow the calling process to request what particular return data is desired. The full payload string is one option. Another is to return the payload string expanded so that each element value occupies its maximum GS1-specified length. Another is to return particular classes of data. Another is to return one or more specified element value(s), if present. Another is to return just the GTIN—either with or without the "01" Application Identifier preamble. Another is to return tagged XML data segregating and tagging each of the parsed AI fields. Etc.

It will be understood that the term Application Identifier is a GS1 term for a tag that indicates the type of data contained in an immediately-following element value.

To review, in one aspect the present technology comprises a system including first, second and third means. The first means produces a first payload from imagery depicting a machine-readable code of a first type. The second means produces a second payload from imagery depicting a machine-readable code of a second type different than the first type, where the second payload is different than the first payload. The third means reconciles the two different payloads produced by the first and second means.

In one particular arrangement, the first means comprises means for producing a payload from imagery depicting a machine-readable code comprising plural parallel lines or a 2D array of binary square elements, and the second means comprises means for producing a payload from imagery depicting a holographic code. In such an arrangement, the holographic code may comprise a machine-readable code comprising plural spaced-apart dots.

In one particular arrangement, the third means comprises means for detecting semantic equivalence between payloads A0 and A1 produced by the first and/or second means within a predefined time window, and for outputting two identical data in response. For example, the third means may output two payloads A0 in response.

In another aspect the technology comprises a system including first and second means. The first means serves to decode first and second optical codes found on an item, producing first and second payloads. The second means serves to determine that the first and second payloads—although different—are semantically-equivalent. By so doing, the system can take different actions in response to said first and second payloads. For example, the first payload can trigger entry of the item on a shopper's checkout tally, while the second does not.

Techniques for decoding conventional barcodes are detailed in copending application Ser. No. 15/094,925, filed Apr. 8, 2016 (now U.S. Pat. No. 10,198,648), which is incorporated by reference. Suitable barcode decoders are also known from the open source ZXing ("Zebra Crossing") barcode project. The ZXing barcode decoders support 1D product codes (UPC-A, UPC-E, EAN-8 and EAN-13), 1D industrial codes (e.g., Code 39, Codabar, etc.) and 2D codes (e.g., QR Code, Data Matrix, etc.). The ZXing source code can be obtained at github<dot>com/zxing/zxing/releases.

Labels of the sort shown in FIG. 1 are commonly printed in-store (e.g., by deli or bakery departments) using thermal printers—often associated with weigh scales. Exemplary thermal printers are detailed in U.S. Pat. Nos. 9,365,055, 7,876,346, 7,502,042, 7,417,656, 7,344,323, and 6,261,009. Direct thermal printers can use cellulosic or polymer media coated with a heat-sensitive dye, as detailed, e.g., in U.S. Pat. Nos. 6,784,906 and 6,759,366.

In addition to the earlier-noted GS1 specification, another GS1 document relevant to the present technology is the "GS1 AIDC Fresh Foods Sold at Point-of-Sale Implementation Guide, Release 1.1, Ratified September, 2015."

Additional data relating to point-of-sale scanners, and related issues, are found in U.S. Pat. Nos. 9,922,220 and 10,204,253.

This specification has discussed several different embodiments. It should be understood that the methods, elements and concepts detailed in connection with one embodiment can be combined with the methods, elements and concepts detailed in connection with other embodiments. While some such arrangements have been particularly described, some have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention. Rather, Applicant claims as the invention all such modifications as may come within the scope and spirit of the following claims and equivalents thereof.

The invention claimed is:

1. A method comprising the acts:
under control of a processor in an optical scanning system that also includes at least one 2D image sensor:
receiving imagery depicting first and second machine-readable codes of first and second different code types, one of said machine-readable code types comprising plural parallel lines encoding payload data, and the other of said machine-readable code types comprising a holographic code encoding payload data;
decoding a first payload from the first machine-readable code of the first code type, and storing the decoded first payload in a memory;
sending the decoded first payload for use by an associated point of sale system;
decoding a second payload from the second machine-readable code of the second code type, the second payload having a different number of symbols than the first payload;
determining that the first and second payloads were encountered within a threshold time interval of each other;
recalling the first payload from the memory;
normalizing the first and second payloads to produce two payloads of identical length;
comparing the first and second payloads after said normalizing;
determining that said payloads match; and
at least in part as a consequence of such match, not sending the decoded second payload for use by the point of sale system.

2. The method of claim 1 in which the normalizing act comprises normalizing the first and second payloads to each have a length of 13 symbols.

3. The method of claim 1 in which the label type comprising plural parallel lines is a label according to the GS1 DataBar standard.

4. The method of claim 1 in which the label type employing holographic encoding comprises plural spaced-apart dots.

5. The method of claim 1 in which the normalizing act comprises adding at least one symbol to the first and/or second payloads.

6. The method of claim 1 that includes, at least in part as a consequence of said match, sending the decoded first payload to the point of sale system a second time.

7. A method comprising the acts:
under control of a processor in an optical scanner assembly that also includes at least one 2D image sensor:
receiving imagery depicting first and second machine-readable labels, one of said machine-readable label types being a label comprising plural parallel lines encoding payload data, and the other of said machine-readable label types comprising a holographic code encoding payload data;
decoding a first payload from the first machine-readable label of the first label type, the first payload beginning with a first two digit application identifier, the first application identifier in the first payload being followed by an associated data string of a N symbols;
sending the decoded first payload for use by an associated point of sale system;
decoding a second payload from the second machine-readable label of the second label type, the second payload being different than the first payload, yet the second payload beginning with said first two digit application identifier included at the beginning of the first payload, said first application identifier in the second payload being followed by an associated data string of P symbols;
determining that the first and second payloads were encountered within a threshold time interval of each other;
in the first decoded payload, identifying a second two-digit application identifier starting at offset N+2 into the first payload, the second application identifier in the first payload being followed by an associated data string of M symbols;
in the second decoded payload, said second two-digit application identifier starting at offset P+2 into the second payload, the second application identifier in the second payload being followed by an associated data string of Q symbols;
determining that the N symbol data string in the first payload, is equivalent to the P symbol data string in the second payload; and determining that the M symbol data string in the first payload is equivalent to the Q symbol data string in the second payload; and
based on data including said determining, not sending the decoded second payload for use by a point of sale system.

8. The method of claim 7 that further includes sending the decoded first payload a second time.

9. A method comprising the acts: receiving imagery that depicts a physical item, the physical item having indicia formed thereon that includes first and second optical codes; decoding said first and second optical codes from the received imagery, said decoding producing a first data string conveyed by the first optical code, and a second, different, data string conveyed by the second optical code; determining that the first and second data strings are semantically-equivalent, despite the second data string being different than the first data string; and based on said determining, taking different actions in response to said first and second data strings.

10. The method of claim 9 in which said different actions comprise sending the decoded first data string to a point of sale terminal, and not sending the second data string to said point of sale terminal.

11. The method of claim 9 that further includes sending the decoded first data string to a point of sale terminal two times.

12. The method of claim 9, performed by a processor in a 2D optical scanner, which is coupled to a point of sale terminal.

13. The method of claim 9 that further comprises determining that said decoding produced the first and second data strings within a threshold time interval of each other.

14. The method of claim 13 that further comprises:
between said decoding of the first and second optical codes, sending the decoded first data string a first time to a point of sale terminal; and
after said decoding of the second optical code, sending the decoded first data string a second time to said point of sale terminal.

15. The method of claim 14 that further includes:
storing in a memory, in association with said decoded first data string, a first time stamp indicating a time at which the decoded first data string was sent to the point of sale terminal the first time; and
updating said memory with a second time stamp indicating a time at which the first decoded data string was sent to the point of sale terminal the second time.

16. The method of claim 14 that further includes, between sending the decoded first data string to the point of sale terminal said first and second times, sending a different data string to the point of sale terminal.

17. The method of claim 15 that includes removing time stamps, and associated data strings, from the memory after they have been in the memory for said threshold time interval.

* * * * *